US012681564B2

(12) United States Patent (10) Patent No.: US 12,681,564 B2
Wang et al. (45) Date of Patent: Jul. 14, 2026

(54) SAFETY BOUNDARY GENERATION

(71) Applicant: Tencent Technology (Shenzhen) Company Limited, Shenzhen (CN)

(72) Inventors: Senbo Wang, Shenzhen (CN); Xiaqiang Dai, Shenzhen (CN); Ziqi Li, Shenzhen (CN); Pan Ji, Shenzhen (CN); Hongdong Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 19/047,844

(22) Filed: Feb. 7, 2025

(65) Prior Publication Data

US 2025/0181145 A1 Jun. 5, 2025

Related U.S. Application Data

(63) Continuation of application No. PCT/CN2023/129308, filed on Nov. 2, 2023.

(30) Foreign Application Priority Data

Jan. 29, 2023 (CN) .......................... 202310107025.0

(51) Int. Cl.
*G06F 3/01* (2006.01)
*G06T 19/00* (2011.01)
(52) U.S. Cl.
CPC ............ *G06F 3/011* (2013.01); *G06T 19/006* (2013.01)
(58) Field of Classification Search
None
See application file for complete search history.

(56) References Cited

U.S. PATENT DOCUMENTS

2016/0364907 A1* 12/2016 Schoenberg ......... G02B 27/017
2021/0319220 A1* 10/2021 Ichim ........................ G06T 7/74

FOREIGN PATENT DOCUMENTS

CN 111708432 A 9/2020

OTHER PUBLICATIONS

International Search Report and Written Opinion received for PCT Patent Application No. PCT/CN2023/129308, mailed on Dec. 11, 2023, 12 pages (5 pages of English Translation and 7 pages of Original Document).

* cited by examiner

*Primary Examiner* — Aneeta Yodichkas
(74) *Attorney, Agent, or Firm* — ARENTFOX SCHIFF LLP

(57) ABSTRACT

In a safety boundary generation method, an image of a surrounding environment captured by a camera in a head-mounted display device is received. Three-dimensional reconstruction is performed based on the image of the surrounding environment to obtain a three-dimensional environment model. The three-dimensional environment model indicates a three-dimensional representation of the surrounding environment of a user that wears the head-mounted display device. Ground detection on the three-dimensional environment model is performed to obtain a plurality of ground boundary points. Each of the plurality of ground boundary points is an intersection point between a ground plane and an obstacle in the surrounding environment. A safety boundary is determined based on the plurality of ground boundary points. A region enclosed by the safety boundary is a safety region for the user to interact with the head-mounted display device. Apparatus and non-transitory computer-readable storage medium counterpart embodiments are also contemplated.

20 Claims, 7 Drawing Sheets

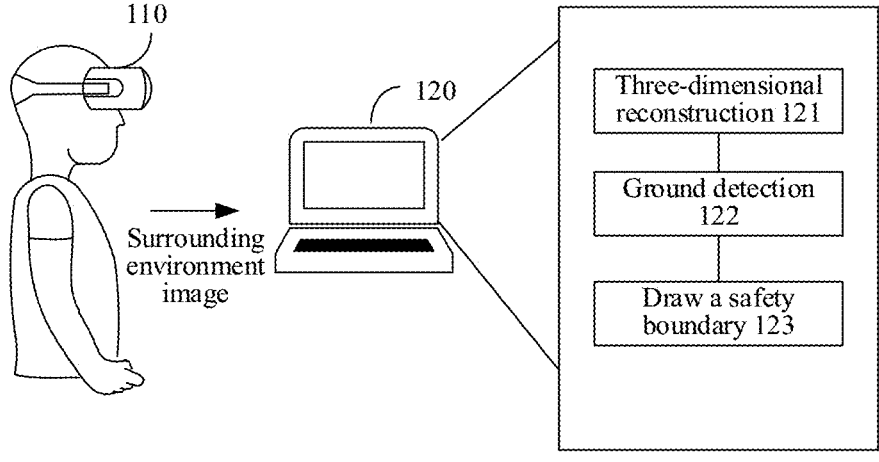

FIG. 1

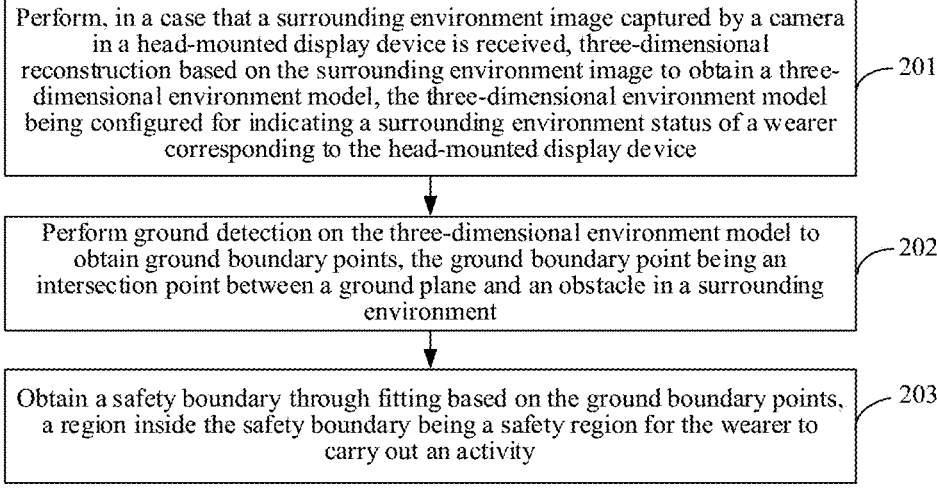

| Perform, in a case that a surrounding environment image captured by a camera in a head-mounted display device is received, three-dimensional reconstruction based on the surrounding environment image to obtain a three-dimensional environment model, the three-dimensional environment model being configured for indicating a surrounding environment status of a wearer corresponding to the head-mounted display device | 201 |

| Perform ground detection on the three-dimensional environment model to obtain ground boundary points, the ground boundary point being an intersection point between a ground plane and an obstacle in a surrounding environment | 202 |

| Obtain a safety boundary through fitting based on the ground boundary points, a region inside the safety boundary being a safety region for the wearer to carry out an activity | 203 |

FIG. 2

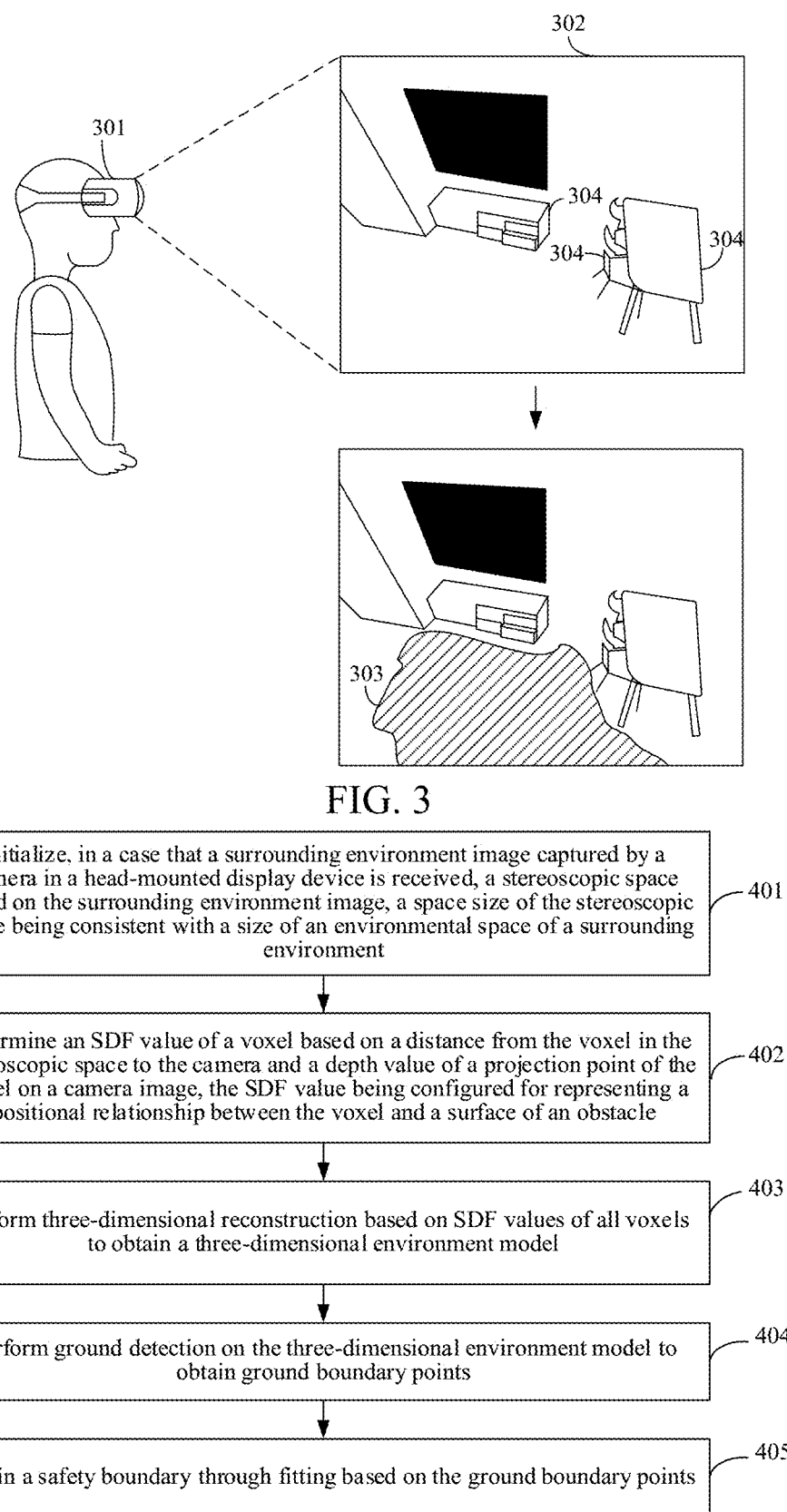

FIG. 3

Initialize, in a case that a surrounding environment image captured by a camera in a head-mounted display device is received, a stereoscopic space based on the surrounding environment image, a space size of the stereoscopic space being consistent with a size of an environmental space of a surrounding environment ⌐401

Determine an SDF value of a voxel based on a distance from the voxel in the stereoscopic space to the camera and a depth value of a projection point of the voxel on a camera image, the SDF value being configured for representing a positional relationship between the voxel and a surface of an obstacle ⌐402

Perform three-dimensional reconstruction based on SDF values of all voxels to obtain a three-dimensional environment model ⌐403

Perform ground detection on the three-dimensional environment model to obtain ground boundary points ⌐404

Obtain a safety boundary through fitting based on the ground boundary points ⌐405

| | | | | | | | | | | | |
|---|---|---|---|---|---|---|---|---|---|---|---|
| 84.8 | 54.6 | 24.4 | ~.8 | −17.0 | 8.2 | 33.4 | 58.2 | 69.2 | 80.3 | 91.7 | 116.5 |
| 49.3 | 14.8 | −15.4 | −45.7 | −60.2 | −35.0 | −9.8 | 9.4 | 20.5 | 31.6 | 46.2 | 85.5 |
| 39.2 | −10.3 | −55.3 | −85.5 | −103.4 | −78.2 | −53.0 | −39.4 | −28.3 | −17.2 | 21.3 | 68.6 |
| 32.3 | 17.2 | −66.7 | −116.3 | −146.6 | −121.4 | −99.3 | −88.1 | −77.0 | −42.3 | 3.0 | 52.3 |
| 25.4 | −24.1 | −73.7 | −104.2 | −132.7 | −161.8 | −148.0 | −136.9 | −105.8 | −58.6 | −11 | 36.0 |
| 24.3 | 6.1 | −34.6 | −63.1 | −91.7 | −127.3 | −170.1 | −169.4 | −120.5 | −71.2 | −22.0 | 27.2 |
| 63.5 | 35.0 | 6. | −22.1 | −58.4 | −102.0 | −135.5 | −129.2 | −111.8 | −62.6 | −13. | 35.9 |
| 104.6 | 76.0 | 47.5 | 9. | −33.9 | −77.5 | −83.6 | −80.1 | −70.2 | −53.9 | −4.7 | 44.6 |
| 145.6 | 117.1 | 77.8 | 34.2 | 9.4 | −31.1 | −33.6 | −31.1 | −21.2 | −11.3 | .0 | 53.2 |
| 186.7 | 145.9 | 102.3 | 58.7 | 21.9 | 18.9 | 16.3 | 17.9 | 27.8 | 37.7 | 47.6 | 72.4 |
| 214.0 | 170.4 | 127.3 | 90.2 | 71.4 | 68.8 | 66.2 | 66.9 | 76.8 | 86.7 | 96.6 | 111.9 |

Three-dimensional
reconstruction module ⌐ 1201

Boundary point
detection module ⌐ 1202

Boundary fitting
module ⌐ 1203

FIG. 12

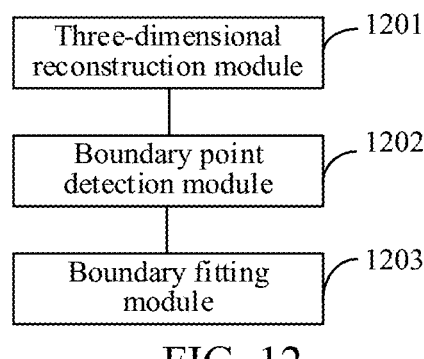

1300

1312

1306

Network

Display ⌐ 1308

Input device ⌐ 1309

Input/Output
controller ⌐ 1310

Input/Output System

1301

Central
processing unit

1311

Network interface
unit

1305

System bus

1304

1302

Random access
memory

Read-only
memory

System memory

1303

1307

Operating system ⌐ 1313

Application
program ⌐ 1314

Another program
module ⌐ 1315

Mass storage
device

FIG. 13

SAFETY BOUNDARY GENERATION

RELATED APPLICATIONS

The present application is a continuation of International Application No. PCT/CN2023/129308, filed on Nov. 2, 2023, which claims priority to Chinese Patent Application No. 202310107025.0, filed on Jan. 29, 2023. The entire disclosures of the prior applications are hereby incorporated by reference.

FIELD OF THE TECHNOLOGY

This application relates to the field of artificial intelligence technologies, including a safety boundary generation method.

BACKGROUND OF THE DISCLOSURE

At present, technologies such as virtual reality (VR), augmented reality (AR), and mixed reality (MR) are widely used, and a wearer can wear a head-mounted display device to experience the technologies. After wearing the head-mounted display device, the wearer may not be able to perceive an obstacle in a surrounding space. For example, an obstacle such as a table or a chair, causing the wearer to easily collide with the obstacle.

To avoid collision between the wearer and the obstacle, in related art, when the wearer uses a head-mounted display device, the wearer may be guided to demarcate a safety boundary and determine a safety region.

SUMMARY

Aspects of this disclosure include a safety boundary generation method, an apparatus, and a non-transitory computer-readable storage medium, so that a safety region in which a wearer can carry out an activity can be automatically generated, thereby improving efficiency of generating a safety boundary. Examples of technical solutions of this disclosure may be implemented are as follows:

An aspect of this disclosure provides a safety boundary generation method, an image of a surrounding environment captured by a camera in a head-mounted display device is received. Three-dimensional reconstruction is performed based on the image of the surrounding environment to obtain a three-dimensional environment model. The three-dimensional environment model indicates a three-dimensional representation of the surrounding environment of a user that wears the head-mounted display device. Ground detection on the three-dimensional environment model is performed to obtain a plurality of ground boundary points. Each of the plurality of ground boundary points is an intersection point between a ground plane and an obstacle in the surrounding environment. A safety boundary is determined based on the plurality of ground boundary points. A region enclosed by the safety boundary is a safety region for the user to interact with the head-mounted display device.

An aspect of this disclosure provides an apparatus. The apparatus includes processing circuitry configured to receive an image of a surrounding environment captured by a camera in a head-mounted display device. The processing circuitry is configured to perform three-dimensional reconstruction based on the image of the surrounding environment to obtain a three-dimensional environment model. The three-dimensional environment model indicates a three-dimensional representation of the surrounding environment of a user that wears the head-mounted display device. The processing circuitry is configured to perform ground detection on the three-dimensional environment model to obtain a plurality of ground boundary points. Each of the plurality of ground boundary points is an intersection point between a ground plane and an obstacle in the surrounding environment. The processing circuitry is configured to determine a safety boundary based on the plurality of ground boundary points. A region enclosed by the safety boundary is a safety region for the user to interact with the head-mounted display device.

An aspect of this disclosure provides a non-transitory computer-readable storage medium storing instructions which when executed by a processor cause the processor to perform any of the methods of this disclosure.

In the aspects of this disclosure, when a wearer wears a head-mounted display device, three-dimensional reconstruction may be performed based on an surrounding environment image captured by a camera in the head-mounted display device to obtain a three-dimensional environment model, so that intersection points between a ground and an obstacle, that is, ground boundary points, may be extracted based on the three-dimensional environment model to generate a safety boundary, and a safety region in which the wearer can carry out an activity may be automatically generated without manual demarcation by the wearer, thereby improving efficiency of generating the safety boundary. In addition, due to the reconstruction for the three-dimensional environment model, the extraction of the ground boundary points according to the three-dimensional environment model can improve accuracy of extracting the ground boundary points, that is, improve accuracy of generating the safety boundary.

BRIEF DESCRIPTION OF THE DRAWINGS

FIG. 1 is a schematic diagram of an implementation environment according to an aspect of this disclosure.

FIG. 2 is a flowchart of a safety boundary generation method according to an aspect of this disclosure.

FIG. 3 is a schematic diagram of generating a safety boundary according to an aspect of this disclosure.

FIG. 4 is a flowchart of a safety boundary generation method according to another aspect of this disclosure.

FIG. 12 is a block diagram of a structure of a safety boundary generation apparatus according to an aspect of this disclosure.

FIG. 13 is a block diagram of a structure of a computer device according to an aspect of this disclosure.

DETAILED DESCRIPTION

Figures 5, 6:
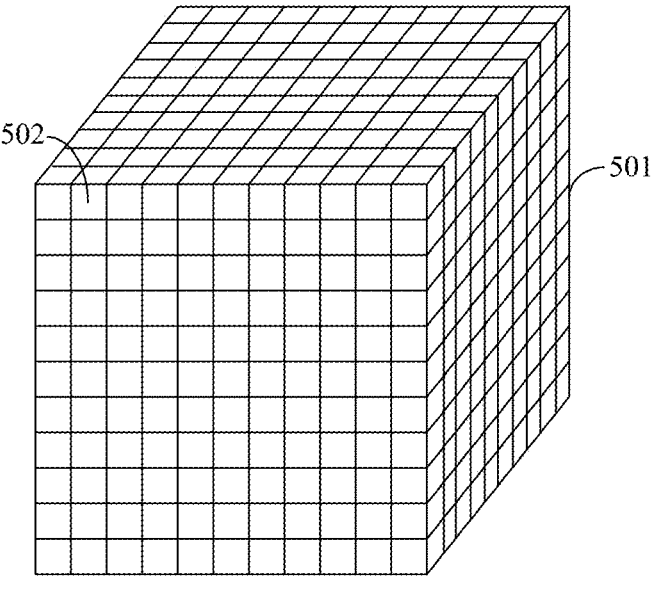
FIG. 5 is a schematic spatial diagram of an initialized stereoscopic space according to an aspect of this disclosure.
FIG. 6 is a schematic diagram of a signed distance field (SDF) value according to an aspect of this disclosure.

To make the objectives, technical solutions, and advantages of this disclosure clearer, the following further describes implementations of this disclosure in detail with reference to the accompanying drawings.

"A plurality of" mentioned herein means two or more. "And/or" describes an association relationship for describing associated objects and represents that three relationships may exist. For example, A and/or B may represent the following three cases: only A exists, both A and B exist, and only B exists. The character "/" indicates an "or" relationship between the associated objects.

After a user wears a head-mounted display device (such as a head-mounted display device in a VR device), the user cannot perceive a surrounding environment status. To avoid collision between the user and a surrounding obstacle, a safety region needs to be generated. In the related art, when a user uses a head-mounted display device, the user may be first instructed to demarcate a safety region. For example, the user may be instructed to demarcate the safety region by touching a ground with a handle. In this manner, manual demarcation is required, leading to relatively cumbersome operations. In the aspects of this disclosure, a safety boundary generation method is provided, in which ground boundary points are extracted by reconstructing a three-dimensional environment model surrounding a wearer (that is, a user wearing a head-mounted display device), and a safety boundary is automatically generated based on the ground boundary points without manual demarcation by the user, thereby improving efficiency of generating a safety region.

The method provided in the aspects of this disclosure may be applied to an indoor scenario or an outdoor scenario. When the method is applied to an indoor scenario, a three-dimensional environment model corresponding to an indoor environment may be established, and a safety boundary corresponding to the indoor environment may be generated. When the method is applied to an outdoor scenario, a three-dimensional environment model corresponding to an outdoor environment within a target distance may be established, that is, a safety boundary within the target distance around the wearer may be generated. For example, a corresponding safety boundary within 5 m of the wearer may be generated. A value of the target distance is not limited in this aspect. In addition, the method provided in the aspects of this disclosure may be applied to VR, AR, MR, and other scenarios. An application scenario of the method is not limited in this aspect.

For example, when applied to a VR scenario, the method may be applied to a VR game. After the VR game is started, a player (that is, a wearer) may be instructed to observe a surrounding environment, so that a camera in a head-mounted display device captures a surrounding environment image. Then, a computer device may establish, according to the surrounding environment image, a three-dimensional environment model of an environment in which the player is located, and generate, according to the three-dimensional environment model, a safety boundary for the player to perform an activity. In a process of playing a game by the player, the computer device may prompt the player according to a position of the player and a position of the safety boundary, so that the player can carry out an activity in a safety region, thereby improving safety of the game. In addition to VR games, the method provided in the aspects of this disclosure may be further applied to VR socialization, VR sports, and the like. This is not limited in this aspect.

FIG. 1 is a schematic diagram of an implementation environment according to an aspect of this disclosure. The implementation environment may include: a head-mounted display device 110 and a computer device 120. A camera assembly is disposed in the head-mounted display device 110, and is configured to capture a surrounding environment image. In one aspect, the head-mounted display device 110 may be a helmet-type device, or may be a glasses-type device. This is not limited in the aspects of this disclosure. The computer device 120 is a device configured to generate a safety boundary. The computer device may be at least one of a smartphone, a tablet computer, an e-book reader, a portable laptop computer, or a desktop computer. Alternatively, the computer device may be a server. This is not limited in this aspect.

In a possible scenario, when a user uses the head-mounted display device 110 indoors or outdoors, after capturing a surrounding environment image, the camera in the head-mounted display device 110 may transmit the surrounding environment image to the computer device 120. The computer device 120 performs three-dimensional reconstruction 121 according to the surrounding environment image to obtain a three-dimensional environment model, and may perform ground detection 122 on the three-dimensional environment model to obtain ground boundary points. Then, a safety boundary 123 may be drawn based on the ground boundary points to generate the safety boundary.

Certainly, the method provided in this aspect of this disclosure may alternatively be performed by a processor in the head-mounted display device, that is, the head-mounted display device. The processor in the head-mounted display device performs three-dimensional reconstruction based on the surrounding environment image to generate the safety boundary. This is not limited in this aspect. For ease of description, the following uses an example in which the method is applied to a computer device for description.

In this disclosure, before user-related data is collected and during collection of the user-related data, a prompt interface or a pop-up window can be displayed, or voice prompt information can be outputted. The prompt interface, the pop-up window, or the voice prompt information is configured for prompting the user that user-related data is currently being collected. In this way, in this disclosure, related operations of obtaining the user-related data start to be performed only after a confirmation operation of the user on the prompt interface or the pop-up window is obtained. Otherwise (that is, when no confirmation operation of the user on the prompt interface or the pop-up window is obtained), the related operations of obtaining the user-related data are ended, that is, the user-related data is not to be obtained.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

FIG. 2 is a flowchart of a safety boundary generation method according to an example of an aspect of this disclosure. This aspect is described by using an example in which the method is applied to a computer device. The method includes the following operations.

Operation 201: Perform, in a case that a surrounding environment image captured by a camera in a head-mounted display device is received, three-dimensional reconstruction based on the surrounding environment image to obtain a three-dimensional environment model, the three-dimensional environment model being configured for indicating a surrounding environment status of a wearer corresponding to the head-mounted display device. For example, an image of a surrounding environment captured by a camera in a head-mounted display device is received. Three-dimensional reconstruction is performed based on the image of the surrounding environment to obtain a three-dimensional environment model. The three-dimensional environment model indicates a three-dimensional representation of the surrounding environment of a user that wears the head-mounted display device.

That is, the computer device receives a surrounding environment image captured by a camera in a head-mounted display device, and performs three-dimensional reconstruction based on the surrounding environment image to obtain a three-dimensional environment model. The three-dimensional environment model is configured for indicating a surrounding environment status of a wearer wearing the head-mounted display device.

After a user wears the head-mounted display device, the user becomes the wearer. The camera in the head-mounted display device captures a surrounding environment image. The computer device may perform three-dimensional reconstruction based on the surrounding environment image. For example, the computer device may perform three-dimensional reconstruction based on surrounding environment images under different perspectives, so that a three-dimensional environment model obtained through reconstruction can more accurately represent a surrounding environment status of the wearer. In a possible implementation, after the user wears the head-mounted display device, the head-mounted display device or another guide device may deliver a guide instruction to guide the wearer to observe a surrounding environment. In this process, the camera may capture surrounding environment images in different perspective directions to obtain surrounding environment images at different perspectives for three-dimensional reconstruction.

In a possible implementation, the computer device may generate a depth map based on the surrounding environment image. The depth map is configured for indicating depth information of each object in the surrounding environment (including but not limited to a distance from the object to the camera), so that three-dimensional reconstruction is performed based on the depth map.

In one aspect, the three-dimensional environment model obtained through three-dimensional reconstruction may indicate a surrounding environment status of the wearer. The three-dimensional environment model includes an obstacle model around the wearer. The obstacle model is configured for indicating an object size and a shape of a surrounding obstacle. The obstacle refers to various objects in the surrounding environment, such as a table, a chair, or a wall. For example, as shown in FIG. 3, a camera in a head-mounted display device 301 captures a frame of surrounding environment image 302, which may be configured for three-dimensional model reconstruction.

Operation 202: Perform ground detection on the three-dimensional environment model to obtain ground boundary points, the ground boundary point being an intersection point between a ground plane and an obstacle in a surrounding environment. For example, ground detection on the three-dimensional environment model is performed to obtain a plurality of ground boundary points. Each of the plurality of ground boundary points is an intersection point between a ground plane and an obstacle in the surrounding environment.

After the three-dimensional environment model is obtained, the computer device may perform ground detection on the three-dimensional environment model to obtain a ground plane through extraction, and determine ground boundary points based on the ground plane obtained through extraction. The ground boundary point is an intersection point between the ground plane and each obstacle, and each obstacle is an obstacle in a surrounding environment.

After the intersection points between the ground plane and the obstacles are determined, a region that is in the ground plane and that does not interface with the obstacles may be determined. The wearer does not come into contact with the obstacles in this region when the wearer carries out an activity. Therefore, a safety boundary may be determined based on the ground boundary points. For example, the safety boundary is obtained through fitting based on the ground boundary points. For another example, adjacent ground boundary points are connected in sequence to obtain the safety boundary. For example, as shown in FIG. 3, in the surrounding environment, obstacles 304 include a cabinet, a table, and a chair, and the ground boundary points are intersection points between the ground plane and the cabinet, the table, and the chair.

Operation 203: Obtain a safety boundary through fitting based on the ground boundary points, a region inside the safety boundary being a safety region for the wearer to carry out an activity. For example, a safety boundary is determined based on the plurality of ground boundary points. A region enclosed by the safety boundary is a safety region for the user to interact with the head-mounted display device.

The ground boundary points are three-dimensional points. Therefore, in a possible implementation, curve fitting further needs to be performed on the ground boundary points to obtain the safety boundary. In one aspect, polynomial curve fitting may be performed on the ground boundary points, and curves obtained through fitting are connected to generate the safety boundary. Polynomial curve fitting is an example of curve fitting, curve fitting is an example of fitting, and obtaining the safety boundary through fitting based on the ground boundary points is an example of determining the safety boundary based on the ground boundary points. A region enclosed by the safety boundary is a safety region for the wearer to carry out an activity.

After the safety boundary is generated, the computer device may prompt the wearer based on a positional relationship between the wearer and the safety boundary, so that the wearer can carry out an activity in the region enclosed by the safety boundary, thereby ensuring safety of the activity of the wearer.

For example, as shown in FIG. 3, after the camera captures the surrounding environment image 302 and the like, the computer device performs three-dimensional reconstruction to obtain a three-dimensional environment model, and then performs ground detection to obtain ground boundary points, to obtain a safety boundary 303 through fitting based on the ground boundary points. A region (a shaded part) in the safety boundary 303 is the safety region.

In this aspect of this disclosure, when a wearer wears a head-mounted display device, three-dimensional reconstruction may be performed based on an surrounding environment image captured by a camera in the head-mounted display device to obtain a three-dimensional environment model, so that intersection points between a ground and an obstacle, that is, ground boundary points, may be extracted based on the three-dimensional environment model to generate a safety boundary, and a safety region in which the wearer can carry out an activity may be automatically generated without manual demarcation by the wearer, thereby improving efficiency of generating the safety boundary. In addition, due to the reconstruction for the three-dimensional environment model, the extraction of the ground boundary points according to the three-dimensional environment model can improve accuracy of extracting the ground boundary points, that is, improve accuracy of generating the safety boundary.

In a possible implementation, in a process of three-dimensional reconstruction, a positional relationship between each three-dimensional point in space and an object is determined based on a depth map, so that the three-dimensional environment model is obtained through reconstruction based on the positional relationship between each three-dimensional point and the object. Descriptions are provided below by using an example of an aspect.

FIG. 4 is a flowchart of a safety boundary generation method according to another example of an aspect of this disclosure. This aspect is described by using an example in which the method is applied to a computer device. The method includes the following operations.

Operation 401: Initialize, in a case that a surrounding environment image captured by a camera in a head-mounted display device is received, a stereoscopic space based on the surrounding environment image, a space size of the stereoscopic space being consistent with a size of an environmental space of a surrounding environment.

In a possible implementation, the computer device may first generate a depth map based on the surrounding environment image captured by the camera. The manner of generating the depth map varies with different types of cameras in the head-mounted display device.

In one aspect, the camera in the head-mounted display device may be a multi-lens camera, and the depth map is generated according to surrounding environment images captured by the multi-lens camera. For example, the camera may be a dual-lens camera, and a stereo matching algorithm is used to obtain a depth map corresponding to the surrounding environment. The algorithm used is not limited in this aspect of this disclosure. Alternatively, the camera in the head-mounted display device may be a depth camera, that is, the depth camera directly captures a depth map corresponding to the surrounding environment.

After the depth map is obtained, three-dimensional reconstruction may be performed based on the depth map. In the process of three-dimensional reconstruction, the computer device first initializes the stereoscopic space, divides the stereoscopic space, and divides the stereoscopic space into cube three-dimensional grids of a same size, so that the three-dimensional environment model is reconstructed based on a positional relationship between each grid and an obstacle in the environment.

The cube three-dimensional grid obtained through division is a voxel, and is a minimum unit constituting a three-dimensional space. A stereoscopic space formed by each voxel is referred to as a voxel grid. For example, as shown in FIG. 5, a stereoscopic space 501 of 5 m×5 m×5 m may be generated, and the stereoscopic space is divided to obtain voxels 502 of a same size.

In one aspect, the space size of the stereoscopic space may be preset by a developer and is a fixed space size. Alternatively, in one aspect, the space size of the stereoscopic space may be determined according to the size of the environmental space of the surrounding environment of the wearer, to avoid an increase in a calculation amount caused by an excessively large stereoscopic space, or inaccuracy of the three-dimensional model caused by an excessively small stereoscopic space.

In a possible implementation, when the space size of the stereoscopic space is determined according to the size of the environmental space of the surrounding environment of the wearer, a user may input space parameters of the environmental space, to initialize the stereoscopic space according to the space parameters. Alternatively, in another possible implementation, because the depth map may indicate depth information, the space size of the stereoscopic space may be automatically determined according to the depth information in the depth map without user input, thereby improving efficiency. The manner of automatically determining the space size of the stereoscopic space may include operations 401a and 401b (not shown in the figure):

Operation 401a: Generate a depth map corresponding to the surrounding environment based on the surrounding environment image. For example, a depth map corresponding to the surrounding environment is generated based on the image of the surrounding environment.

In an example in which the camera is a dual-lens camera, the computer device may process, by using a stereo matching algorithm, a surrounding environment image captured by the dual-lens camera, to obtain a depth map of the surrounding environment.

The depth map varies with surrounding environment images captured in different perspective directions. That is, a plurality of frames of depth maps are generated, and three-dimensional reconstruction is subsequently performed based on the plurality of frames of depth maps.

Operation 401b: Initialize the stereoscopic space based on a maximum depth value in the depth map. For example, the stereoscopic space is initialized based on a maximum depth value in the depth map.

During initialization of the stereoscopic space, because it only needs to ensure that the space size of the stereoscopic space is consistent with the size of the environmental space, the space size of the stereoscopic space may be determined based only on a maximum depth value in one frame of depth map, to improve determining efficiency. In a possible implementation, the space size of the stereoscopic space may be determined according to a maximum depth value in a first frame of depth map. For example, when the maximum depth value in the first frame of depth map is 5 m, a stereoscopic space of 5 m×5 m×5 m may be generated.

Alternatively, in another possible implementation, the space size of the stereoscopic space may be determined based on an average value of maximum depth values corresponding to all first n frames of depth maps to improve accuracy. For example, n may be 5, and an average depth value is determined according to maximum depth values respectively corresponding to first five frames of depth maps, and thus the average depth value is determined as a side length of the stereoscopic space, thereby determining the space size of the stereoscopic space.

Operation 402: Determine an SDF value of a voxel based on a distance from the voxel in the stereoscopic space to the camera and a depth value of a projection point of the voxel on a camera image, the SDF value being configured for representing a positional relationship between the voxel and a surface of an obstacle. For example, a signed distance field (SDF) value for each voxel of a plurality of voxels in the stereoscopic space is determined based on a distance from the respective voxel to the camera and a depth value of a voxel projection point on a surface of the obstacle. The voxel projection point is an intersection point between a three-dimensional line from the voxel to an optical center of the camera and the surface of the obstacle. The SDF value represents a positional relationship between the respective voxel and the surface of the obstacle.

In this aspect, a positional relationship between a voxel and a surface of an obstacle in the environment is represented by an SDF value. SDF is a manner of expressing a three-dimensional model in a voxel grid. It is assumed that the three-dimensional model is a watertight entity, and the watertight entity refers to an entity that water cannot enter, that is, a closed entity. In this case, there is an interface (an isosurface) between an "inside" and an "outside" of the entity. Inside the interface, a negative distance is set, that is, the SDF value is negative, while outside the interface, a positive distance is set, that is, the SDF value is positive, to indicate a relationship between each voxel and a surface of an object. It can be learned from the foregoing description in operation 201 that the three-dimensional environment model includes an obstacle model around the wearer. Therefore, the obstacle model may be a three-dimensional model, and the foregoing interface may represent an surface of the obstacle.

For example, FIG. 6 shows SDF values corresponding to different voxels under 2D projection. An SDF value of a voxel inside an interface 601 is negative, an SDF value of a voxel outside the interface 601 is positive, and a larger distance from the interface indicates a larger absolute value of a difference. It can be learned from FIG. 6 that when a voxel is partially located inside the interface 601 and partially located outside the interface 601, an SDF value of the voxel may be positive or negative. For example, referring to an upper left corner in FIG. 6, both a voxel with an SDF value of 14.8 and a voxel with an SDF value of −15.4 are voxels partially located inside the interface 601 and partially located outside the interface 601. For example, if a proportion of a part of a voxel located inside the interface 601 in the voxel exceeds a threshold, it may be considered that the voxel is located inside the interface 601. Alternatively, if a proportion of a part of a voxel located inside the interface 601 in the voxel does not exceed a threshold, it may be considered that the voxel is located outside the interface 601.

After the SDF value of the voxel is determined, a positional relationship between the voxel and the obstacle model may be determined. When the SDF value of the voxel is negative, it may be determined that the voxel is located inside the surface of the obstacle, that is, inside the obstacle model. When the SDF value of the voxel is positive, it may be determined that the voxel is located outside the surface of the obstacle, that is, outside the obstacle model. After a positional relationship between each voxel and the obstacle is determined, a position of the interface (the surface of the obstacle) may be determined, and thus the inside and the outside of the model is determined and the inside of the model is extracted to obtain the three-dimensional model.

In a possible implementation, the computer device determines the SDF value of the voxel based on the distance from the voxel to the camera and a difference between the depth value of the projection point of the voxel on the camera image (also referred to as a voxel projection point). The depth value corresponding to the voxel projection point is a distance from the camera to an intersection point between the surface of the obstacle and a three-dimensional line obtained by connecting the voxel to an optical center of the camera. The distance from the voxel to the camera refers to a relative distance from the voxel to the camera, that is, a depth from the voxel to the camera.

Figure 7:
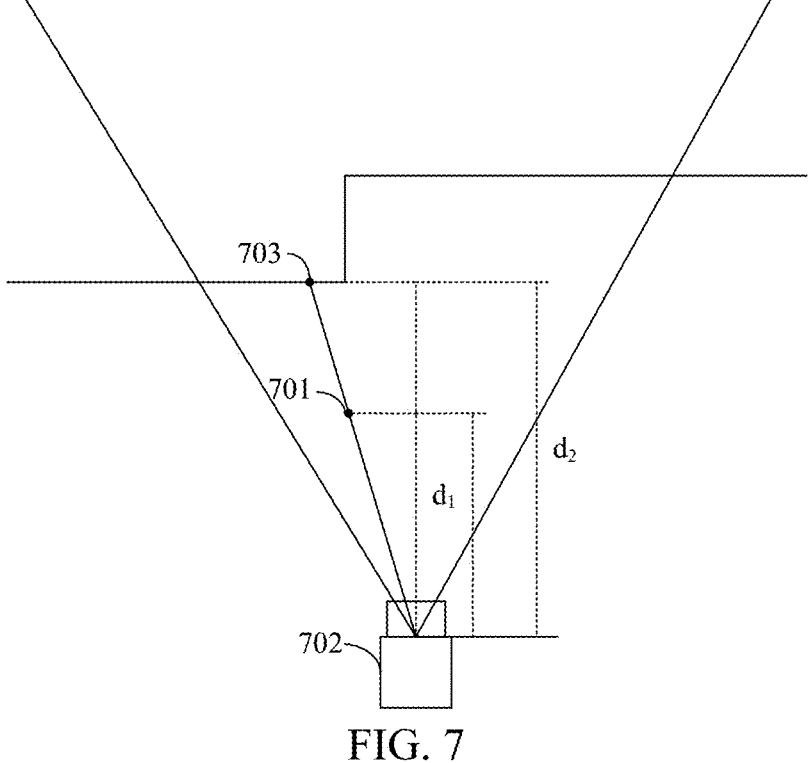
FIG. 7 is a schematic diagram showing a principle for calculating an SDF value according to an aspect of this disclosure.

For example, as shown in FIG. 7, a distance between a voxel 701 and a camera 702 is $d_1$, a depth value corresponding to a voxel projection point is $d_2$ ($d_2$ is a distance from the camera to an intersection point 703 between a surface of an obstacle and a three-dimensional line connecting the voxel 701 to an optical center of the camera), and an SDF value of the voxel 701 is $d_2-d_1$. When the depth value corresponding to the voxel projection point is greater than the distance between the voxel and the camera, it is determined that the voxel is located outside the surface of the obstacle, and the SDF value is a positive value. When the depth value corresponding to the voxel projection point is less than the distance between the voxel and the camera, it is determined that the voxel is located inside the surface of the obstacle, and the SDF value is a negative value.

The distance from the voxel to the camera may be calculated based on three-dimensional coordinates of the voxel in a world coordinate system and three-dimensional coordinates of the camera. The three-dimensional coordinates of the camera may be determined based on a camera pose calculated through simultaneous localization and mapping (SLAM) (the camera pose includes three-dimensional coordinate information and orientation angle information of the camera). The three-dimensional coordinates of the voxel may be determined based on a position of the voxel in a stereoscopic space. Three-dimensional coordinates of a voxel center (that is, a cube center) may be determined as the three-dimensional coordinates of the voxel. The stereoscopic space is a space established with the world coordinate system as an origin. Therefore, after the position of the voxel in the stereoscopic space is determined, the three-dimensional coordinates of the voxel may be determined.

The depth value corresponding to the voxel projection point may be read from a depth map. In a possible implementation, the computer device may project a center point of the voxel onto the camera image to determine the voxel projection point. During the projection, if a pixel point correspondingly exists at a projection position, a depth value corresponding to the pixel point is read from the depth map and is determined as the depth value of the voxel projection point. If the projection position is not projected onto any pixel point, a pixel point closest to the voxel projection point may be found by using a nearest neighbor algorithm, the voxel projection point is updated to the nearest pixel point, and a corresponding depth value is read from the depth map.

In the foregoing manner, the SDF value of the voxel is an SDF value determined based only on one frame of depth map. In some cases, one frame of depth map cannot completely express actual depth information of the entire object, and the SDF value determined based only on the one frame of depth map may have an error. Therefore, in these cases, the SDF value needs to be iteratively updated based on a plurality of frames of depth maps to obtain an accurate SDF value. The manner may include operation $402a$ and operation $402b$ (not shown in the figure):

Operation $402a$: Determine an $i^{th}$ frame of initial SDF value of the voxel based on a difference between an $i^{th}$ distance from the voxel to the camera and an $i^{th}$ depth value of a projection point of the voxel on the camera image (that is, the foregoing voxel projection point) indicated by an $i^{th}$ frame of depth map, i being a positive integer. For example, an $i^{th}$ frame initial SDF value for each voxel is determined based on a difference between an $i^{th}$ distance from the respective voxel to the camera and an $i^{th}$ depth value of the voxel projection point indicated by an $i^{th}$ frame of a depth map, i being a positive integer.

In a possible implementation, an $i^{th}$ depth value corresponding to the voxel projection point is read based on an $i^{th}$ frame of depth map captured in an $i^{th}$ line-of-sight direction, and an $i^{th}$ distance between the voxel and the camera is determined based on a pose of the camera and a position of a center point of the voxel at this time, so that the $i^{th}$ frame of initial SDF value is determined based on a difference between the $i^{th}$ depth value and the $i^{th}$ distance.

Operation $402b$: Update the $i^{th}$ frame of initial SDF value based on an $i^{th}$ frame of update weight corresponding to the voxel and an $(i-1)^{th}$ frame of SDF value to obtain an $i^{th}$ frame of SDF value, the $i^{th}$ frame of update weight being determined based on an angle between a three-dimensional line between an optical center of the camera and the voxel (that is, a three-dimensional line obtained by connecting the voxel to the optical center of the camera) and an $i^{th}$ line-of-sight direction of the camera. For example, the $i^{th}$ frame initial SDF value is updated based on an $i^{th}$ frame of update weight corresponding to the respective voxel and an $(i-1)$th frame of SDF value to obtain an $i^{th}$ frame of SDF value. The $i^{th}$ frame of update weight is determined based on an angle between the three-dimensional line from the respective voxel to the optical center of the camera and an $i^{th}$ line-of-sight direction of the camera.

After the $i^{th}$ frame of initial SDF value is obtained, cumulative update further needs to be performed based on the $(i-1)^{th}$ frame of SDF value.

That is, an iterative update process is a cumulative update process, and the cumulative update needs to be performed based on SDF values calculated in a plurality of previous frames. An update manner may be expressed in the following equation:

$$TSDF_i(x) = \frac{W_{i-1}(x)TSDF_{i-1}(x) + w_i(x)tsdf_i(x)}{W_{i-1}(x) + w_i(x)}$$

$$W_i(x) = W_{i-1}(x) + w_i(x)$$

where $TSDF_i(x)$ is an $i^{th}$ frame of SDF value of a voxel x, $W_i(x)$ is an $i^{th}$ frame of accumulated weight, $W_{i-1}(x)$ is an $(i-1)^{th}$ frame of accumulated weight, $TSDF_{i-1}(x)$ is an $(i-1)^{th}$ frame of SDF value of the voxel x, $w_i(x)$ is an $i^{th}$ frame of update weight, and $tsdf_i(x)$ is an $i^{th}$ frame of initial SDF value of the voxel x.

In a possible implementation, the $i^{th}$ frame of update weight is determined based on the angle between the three-dimensional line between the optical center of the camera and the voxel and the $i^{th}$ line-of-sight direction of the camera, and a cosine of the angle is the $i^{th}$ frame of update weight. The update weight is related to a positional relationship between the voxel projection point and an edge of the camera image. When the voxel projection point is closer to the edge of the camera image, the update weight is lower, that is, there is a positive correlation. When the voxel projection point is closer to the edge of the camera image, the angle is larger, and a cosine value is smaller. Therefore, the cosine value may be determined as the update weight.

In one aspect, the computer device may determine, as the SDF value of the voxel, an SDF value obtained through updating based on a last frame of depth map. The last frame of depth map may be a depth map corresponding to a last frame of environment image obtained after a week of collection of the surrounding environment. Alternatively, a frame quantity threshold may be preset. When a quantity of times of updating reaches the frame quantity threshold, the updating may be stopped, and the SDF value is outputted as the SDF value of the voxel. For example, the frame quantity threshold may be 100 frames. After cumulative update is performed based on the 100 frames of depth maps, the SDF value corresponding to each voxel may be outputted.

Operation 403: Perform three-dimensional reconstruction based on SDF values of all voxels to obtain a three-dimensional environment model. For example, the three-dimensional reconstruction is performed based on the SDF values of the plurality of voxels to obtain the three-dimensional environment model.

After the SDF values corresponding to all the voxels are calculated, the computer device may determine a positional relationship between each voxel and the surface of the obstacle, to perform three-dimensional reconstruction. The process of the three-dimensional reconstruction may include operations $403a$ to $403c$ (not shown in the figure):

Operation $403a$: Perform three-dimensional reconstruction calculation based on the SDF values of all the voxels by using a marching cubes (MC) algorithm, to obtain an initial three-dimensional environment model. For example, a three-dimensional reconstruction calculation is performed based on a marching cubes (MC) algorithm, to obtain an initial three-dimensional environment model.

In a possible implementation, the SDF values of all the voxels are calculated by using an MC algorithm, to obtain the three-dimensional environment model through extraction. Certainly, the MC algorithm is merely an example, and an algorithm for performing three-dimensional reconstruction calculation is not limited in this aspect of this disclosure.

The MC algorithm is an algorithm for constructing a three-dimensional model by using an SDF. A voxel through which an interface (that is, a surface of an obstacle) passes may be determined based on an SDF value of each voxel. Among eight vertices of a cube corresponding to the voxel through which the interface passes, one or more vertices are definitely located inside the model, that is, inside the surface of the obstacle, and one or more vertices are definitely located outside the model, that is, outside the surface of the obstacle, so that a position of the interface may be determined. After all voxels through which the interface passes are determined, intersection points between the interface and all the voxels may be calculated, then the intersection points are connected to obtain a plurality of triangular patches, and then, the triangular patches are connected to form an initial three-dimensional environment model.

Operation 403*b*: Perform repair processing on the initial three-dimensional environment model to obtain a repaired three-dimensional environment model. For example, repair processing is performed on the initial three-dimensional environment model to obtain a repaired three-dimensional environment model.

In the initial three-dimensional environment model obtained through three-dimensional reconstruction according to the MC algorithm, there may be a case in which a connection relationship between connection points (an intersection point between an interface and a voxel) is incorrect, or a patch is independent of the model, or the like, and the model cannot accurately represent an environment status. Therefore, in a possible implementation, the computer device further needs to perform repair processing on the initial three-dimensional environment model to obtain the repaired three-dimensional environment model. For example, the performing repair processing on the initial three-dimensional environment model may include: performing repair processing on at least one of a connection relationship between the patches and a connection relationship of the connection points in the initial three-dimensional environment model. The repair process includes the following operations.

Operation 1: Perform patch division on the initial three-dimensional environment model. For example, the initial three-dimensional environment model is divided into a plurality of patches. Each of the plurality of patches is obtained by connecting a plurality of connection points.

The computer device performs patch division on the initial three-dimensional environment model to obtain patches (that is, a plurality of patches), and one patch is obtained by connecting a plurality of connection points. In one aspect, the initial three-dimensional environment model may be divided into a plurality of triangular patches according to an original connection relationship. The original connection relationship may be a connection relationship between the plurality of patches when no repair processing is performed temporarily. It can be learned from the foregoing description in operation 403*a* that the triangular patches are connected to form the initial three-dimensional environment model, and a connection relationship is required for the connection.

Operation 2: Remove a duplicate patch and an independent patch from the patches, the independent patch being a patch having no connection relationship with other patches. For example, duplicate patches and independent patches are removed from the plurality of patches to obtain remaining patches. Each independent patch has no connection relationship with any of the other patches.

In other words, a duplicate patch and an independent patch are removed from the plurality of patches to obtain remaining patches, the independent patch having no connection relationship with other patches, and the other patches being patches in the plurality of patches other than the independent patch. After the patch division is performed, because the plurality of patches may include at least one type of patch of a duplicate patch, an independent patch, and a pathological patch, the at least one type of patch needs to be removed. For example, the duplicate patch and the independent patch are removed.

In a possible implementation, the computer device may determine duplicate patches based on coordinate positions of connection points corresponding to a patch (that is, connection points to be connected to obtain the patch), the duplicate patches being patches with same connection points, and then the duplicate patches may be removed. For example, two patches whose connection points are all 1, 2, 3 and connection relationships are 1-2-3 and 3-2-1, respectively, are duplicate patches. The computer device may further determine, according to the initial three-dimensional environment model, whether a patch is an independent patch. A patch having no connection relationship with each patch is an independent patch, and the independent patch needs to be removed.

In addition, the patches may further include a pathological patch. The pathological patch refers to a patch in which connection points have abnormalities in the patches, including a patch in which connection points are on a same straight line (for example, connection points 1, 2, and 3 of a patch are on a same straight line), and a patch in which connection points include duplicate points (for example, 1, 2 of connection points 1, 2, and 3 of a patch are duplicate points). Whether a patch is a pathological patch may be determined according to coordinate positions of connection points, and the pathological patch is removed.

Operation 3: Remove duplicate points included in the patches and independent points located outside the patches. For example, duplicate points and independent points are removed from the plurality of connection points to obtain remaining connection points. Each independent point is located outside the plurality of patches.

Because the plurality of patches can be obtained by performing patch division on the initial three-dimensional environment model, and each of the plurality of patches is obtained by connecting a plurality of connection points, there are a plurality of connection points. The plurality of connection points may include at least one of a duplicate point or an independent point. Therefore, the computer device needs to remove the at least one point to obtain the remaining connection points. For example, the computer device removes a duplicate point and an independent point from the plurality of connection points to obtain remaining connection points.

In addition to the patch removal process, the computer device further needs to remove duplicate points. The duplicate points are connection points with same three-dimensional coordinates. Because there is a floating-point operation in the process of three-dimensional reconstruction, a floating-point number may cause an error, causing connection points at a same position to be identified as two different connection points. Therefore, the computer device needs to perform calculation based on three-dimensional coordinates of each connection point, determine duplicate points located at a same position, and remove the duplicate points.

In addition, after the initial three-dimensional environment model is established, there may further include an independent point, that is, an independent connection point that has no connection relationship with other connection points and that is located outside each patch, or in other words, the independent point is located outside the plurality of patches. The computer device finds the independent point according to the connection relationship, and removes the independent point.

In addition, there may also be an independent edge that does not form a patch through connection, for example, an independent edge connecting only connection points 1 and 2, and the independent edge further needs to be removed. Removing the independent edge is equivalent to removing different independent points forming the independent edge.

Operation 4: Reconstruct a connection relationship between the remaining patches and the remaining connection points to obtain the repaired three-dimensional environment model. For example, connection relationships between the remaining patches and the remaining connection points are reconstructed to obtain the repaired three-dimensional environment model.

After the patch removal and point removal processes are performed, the computer device may re-establish a connection relationship between the remaining connection points and the remaining patches. A manner of establishing the connection relationship is the same as an establishment manner in the MC algorithm. After the connection relationship is reconstructed, the repaired three-dimensional environment model may be obtained.

Operation 403c: Perform simplification processing on the repaired three-dimensional environment model to obtain the three-dimensional environment model, the simplification processing being configured for removing redundant patches. For example, simplification processing is performed on the repaired three-dimensional environment model in which a plurality of redundant patches is removed to obtain the three-dimensional environment model.

In a possible implementation, the repaired three-dimensional environment model may include a redundant model, that is, include noise. Therefore, simplification processing needs to be performed, and the three-dimensional environment model is obtained after the simplification processing. The process of simplification processing may include the following operations.

Operation 1: Remove a reconstructed patch in the repaired three-dimensional environment model in a case that a total quantity of connections of the reconstructed patch is less than a connection threshold. For example, a first reconstructed patch in the repaired three-dimensional environment model is removed when a total quantity of connections of the first reconstructed patch is less than a connection threshold. The first reconstructed patch is obtained via the repair processing.

The reconstructed patch is obtained through the repair processing. The repair processing is, for example, the repair processing described above in operation 403b. After the connection relationship is reconstructed to obtain the repaired three-dimensional environment model, a connection relationship between reconstructed patches may be obtained, and a total quantity of connections corresponding to the reconstructed patch is determined. The total quantity of connections refers to a total quantity of continuously connected patches. For example, when a patch 1 is connected to a patch 2, the patch 2 is connected to a patch 3, the patch 3 is connected to a patch 4, and they are not connected to other patches, it is determined that a total quantity of connections of the patch 1, the patch 2, the patch 3, and the patch 4 is 4.

In one aspect, when the total quantity of connections is less than the connection threshold, the patch may be deleted. In other words, when a total quantity of connections corresponding to a reconstructed patch is less than the connection threshold, the reconstructed patch may be deleted. For example, the connection threshold may be 10, and the computer device removes a patch whose total quantity of connections is less than 10.

Operation 2: Remove a reconstructed patch in a case that a distance between the reconstructed patch and the camera is greater than a distance threshold. For example, a second reconstructed patch is removed when a distance between the second reconstructed patch and the camera is greater than a distance threshold.

In a possible implementation, due to a limited activity range of the wearer, to reduce a calculation amount, a patch outside the activity range may be removed, that is, there is no need to establish a three-dimensional model outside the activity range. The computer device may store a distance threshold for representing the activity range of the wearer. The distance threshold may be preset by a developer or customized by a user. This is not limited in this aspect.

When it is detected that the distance between the reconstructed patch and the camera is greater than the distance threshold, it is determined that the activity range is exceeded, and the patch may be removed. For example, the distance threshold may be 3 m, and the computer device may remove a reconstructed patch 3 m away.

Operation 3: Remove reconstructed patches belonging to an independent region in a case that a region volume of the independent region formed by the reconstructed patches is less than a volume threshold. For example, a plurality of reconstructed patches belonging to an independent region is removed when a region volume of the independent region is less than a volume threshold.

A plurality of reconstructed patches may further form an independent region, and the formed independent region may be free from a model of each obstacle model. Therefore, such a region needs to be removed. In a possible implementation, the computer device calculates a region volume of the independent region, and when the region volume is less than the volume threshold, the independent region may be removed, that is, the reconstructed patches belonging to the independent region may be removed. For example, the volume threshold may be one thousandth of a total volume of the model. When the region volume of the independent region is less than one thousandth of the total volume of the model, the removal operation is performed.

The patch removal processes of operation 1, operation 2, and operation 3 included in the foregoing simplification process may be performed synchronously or sequentially, or at least one of operation 1, operation 2, and operation 3 may be selected for execution according to an actual requirement. In this aspect, an implementation is merely described by using an example, and an execution time sequence is not limited.

Operation 4: Determine the repaired three-dimensional environment model after patch removal as the three-dimensional environment model. For example, a plurality of reconstructed patches belonging to an independent region is removed when a region volume of the independent region is less than a volume threshold.

In a possible implementation, the three-dimensional environment model may be obtained after the foregoing simplification processing is performed on the repaired three-dimensional environment model. Alternatively, to further reduce noise, filtering may be performed on the repaired three-dimensional environment model after the patch removal. In one aspect, Laplacian filtering may be performed, and the three-dimensional environment model is obtained after the filtering.

Figure 8:
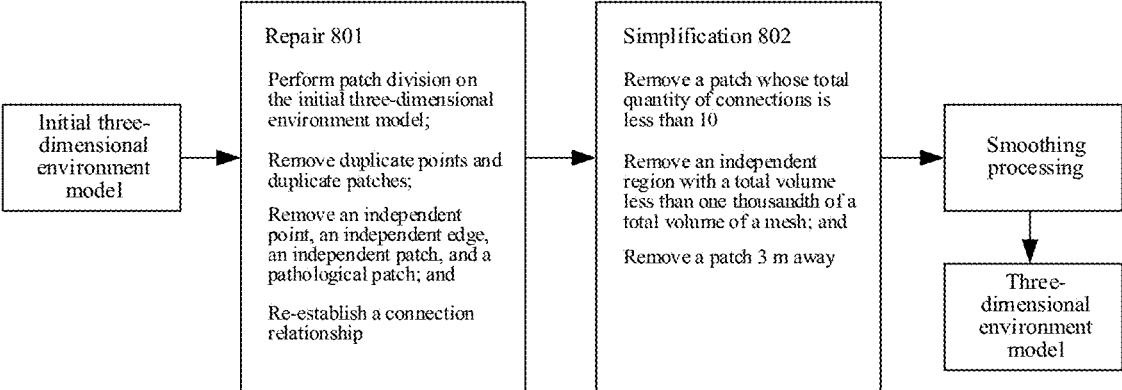
FIG. 8 is a flowchart for processing an initial three-dimensional environment model according to an aspect of this disclosure.

For example, as shown in FIG. 8, after the initial three-dimensional environment model is obtained through calculation by using the MC algorithm, a repair process 801 may be included. In this process, patch division is first performed on the initial three-dimensional environment model. Then, duplicate points and duplicate patches are removed. In addition, an independent point, an independent edge, an independent patch, and a pathological patch are removed, and a connection relationship is re-established. After the repair process 801 ends, a simplification process 802 is performed, including removing a patch whose total quantity of connections is less than 10, removing an independent region with a total volume less than one thousandth of a total volume of a model (mesh), and removing a patch 3 m away. After the simplification process 802 ends, smoothing processing is performed, that is, Laplacian filtering is performed on the mesh, to obtain the three-dimensional environment model.

Operation 404: Perform ground detection on the three-dimensional environment model to obtain ground boundary points. For example, ground detection on the three-dimensional environment model is performed to obtain a plurality of ground boundary points.

Operation 405: Obtain a safety boundary through fitting based on the ground boundary points. For example, a safety boundary is determined based on the plurality of ground boundary points.

The manners of performing ground detection on the three-dimensional environment model, determining the ground boundary points, and performing fitting to obtain the safety boundary are described in detail in the following aspect. Details are not described again in this aspect.

In this aspect, a stereoscopic space is initialized, and three-dimensional reconstruction is performed based on a positional relationship between each voxel in the stereoscopic space and a surface of an obstacle, so that accuracy of a three-dimensional environment model can be ensured. In addition, SDF values of all the voxels are obtained through iteration based on depth information of a plurality of frames of depth maps, so that accuracy of the SDF values can be ensured, thereby improving the accuracy of the three-dimensional environment model. In addition, in this aspect, after the three-dimensional environment model is obtained through calculation by using an MC algorithm, processes of repairing a connection relationship, patch simplification, and smoothing processing are further performed on the three-dimensional environment model, thereby reducing a model error and noise in the model, and improving accuracy of reconstruction of the three-dimensional model.

After the three-dimensional environment model is obtained through reconstruction, ground extraction may be performed on the three-dimensional environment model to obtain a ground plane, so that ground boundary points are determined based on the ground plane. Then, curve fitting is performed on the ground boundary points to obtain a safety boundary. Descriptions are provided below by using an example of an aspect.

Figure 9:
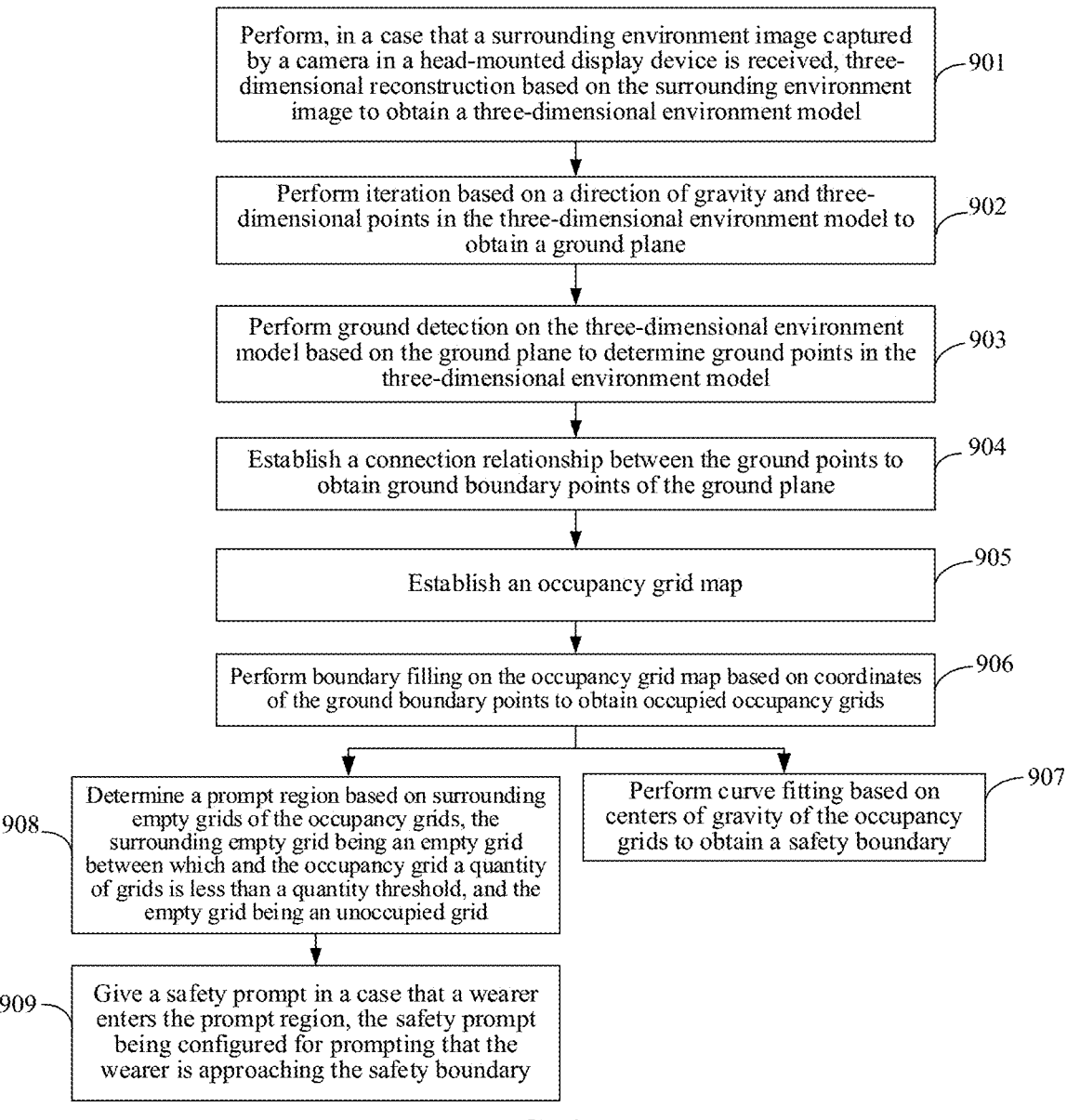
FIG. 9 is a flowchart of a safety boundary generation method according to another aspect of this disclosure.

FIG. 9 is a flowchart of a safety boundary generation method according to another aspect of this disclosure. This aspect is described by using an example in which the method is applied to a computer device. The method includes the following operations.

Operation 901: Perform, in a case that a surrounding environment image captured by a camera in a head-mounted display device is received, three-dimensional reconstruction based on the surrounding environment image to obtain a three-dimensional environment model. For example, an image of a surrounding environment captured by a camera in a head-mounted display device is received. Three-dimensional reconstruction is performed based on the image of the surrounding environment to obtain a three-dimensional environment model. The three-dimensional environment model indicates a three-dimensional representation of the surrounding environment of a user that wears the head-mounted display device.

For an implementation of operation 901, refer to the foregoing aspect. Details are not described again in this aspect.

Operation 902: Perform iteration based on a direction of gravity and three-dimensional points in the three-dimensional environment model to obtain a ground plane. For example, a ground plane is iteratively determined based on a direction of gravity and a plurality of three-dimensional points in the three-dimensional environment model.

After the three-dimensional environment model is obtained, ground detection needs to be performed to obtain the ground boundary points. In this process, the computer device first determines the ground plane. In a possible implementation, the computer device may perform iteration by using a random sample consensus (RANSAC) algorithm to obtain the ground plane. The iterative process may include operations 902a to 902c (not shown in the figure):

Operation 902a: Establish an $i^{th}$ plane based on the direction of gravity and an $i^{th}$ three-dimensional point in the three-dimensional environment model, the direction of gravity being a normal direction of the $i^{th}$ plane, and i being a positive integer. For example, an $i^{th}$ plane is established based on the direction of gravity as a normal vector and an $i^{th}$ three-dimensional point in the three-dimensional environment model, i being a positive integer.

In a possible implementation, when a normal vector of a plane and coordinates of a point in the plane are known, a plane equation expressing the plane may be obtained through solving. In this aspect, to obtain the ground plane, the direction of gravity may be determined as the normal direction of the plane. In addition, a plane equation may be obtained by using any point in the three-dimensional environment model as a point in the plane.

In one aspect, the computer device may establish an $i^{th}$ plane according to three-dimensional coordinates of an $i^{th}$ three-dimensional point in the three-dimensional environment model and the direction of gravity.

Operation 902b: Verify the $i^{th}$ plane based on remaining three-dimensional points in the three-dimensional environment model to obtain a quantity of three-dimensional points conforming to the $i^{th}$ plane, the remaining three-dimensional points being points in the three-dimensional environment model other than the $i^{th}$ three-dimensional point. For example, the $i^{th}$ plane is verified based on a plurality of remaining three-dimensional points in the three-dimensional environment model to obtain a quantity of three-dimensional points conforming to the $i^{th}$ plane. The remaining three-dimensional points are three-dimensional points in the three-dimensional environment model other than the $i^{th}$ three-dimensional point.

The other points are also three-dimensional points. For the established $i^{th}$ plane, accuracy of the plane may be verified through three-dimensional points other than the $i^{th}$ three-dimensional point. In a possible implementation, three-dimensional coordinates of the remaining three-dimensional points may be substituted into the plane equation, and a quantity that conforms to the plane equation is recorded, to obtain the quantity of three-dimensional points conforming to the $i^{th}$ plane.

In this manner, the computer device may perform iterative calculation on the foregoing operations, so that n planes (n is also a positive integer, and a value of i ranges from 1 to n) may be established and quantities of three-dimensional points that respectively correspond to the n planes and that conform to the planes may be obtained. When an iteration quantity threshold is reached, the iteration may be stopped. For example, the iteration quantity threshold may be 10000, that is, the computer device may establish 10000 random planes, and obtain quantities of three-dimensional points corresponding to the 10000 planes.

Operation 902c: Determine a plane corresponding to a largest quantity of three-dimensional points as the ground plane. For example, a plane corresponding to the largest quantity of conforming three-dimensional points is determined as the ground plane.

The largest quantity of three-dimensional points is a largest quantity of three-dimensional points in all quantities of three-dimensional points, the all quantities of three-dimensional points are quantities of three-dimensional points of all planes, and the $i^{th}$ plane is one of all the planes. After the iteration ends, the computer device may determine a plane with the largest quantity of three-dimensional points as the ground plane. For example, when a quantity of three-dimensional points conforming to and corresponding to a $k^{th}$ plane is the largest, a plane equation corresponding to the $k^{th}$ plane is determined as a plane equation of the ground plane.

Operation 903: Perform ground detection on the three-dimensional environment model based on the ground plane to determine ground points in the three-dimensional environment model. For example, a plurality of ground points in the three-dimensional environment model is identified based on the ground plane.

After obtaining the plane equation corresponding to the ground plane, the computer device may perform ground detection based on the plane equation of the ground plane, to obtain the ground points in the three-dimensional environment model.

In a possible implementation, the computer device may substitute each three-dimensional point in the three-dimensional environment model into the plane equation of the ground plane. When a three-dimensional point belongs to the ground plane, the three-dimensional point may be determined as a ground point.

Operation 904: Establish a connection relationship between the ground points to obtain ground boundary points of the ground plane. For example, a connection relationship between the plurality of ground points is established to obtain the plurality of ground boundary points on the ground plane.

After the ground points are obtained, a connection relationship between the ground points further needs to be established, to determine the ground boundary points. The computer device may determine a connection relationship between the ground points based on a relationship between each ground point and the obstacle model, to ensure that an enclosed region does not include the obstacle model. In establishing the connection relationship, a ground point that has a connection relationship with another ground point may be determined as a ground boundary point, thus obtaining an intersection point between the ground plane and the obstacle.

Figure 10:
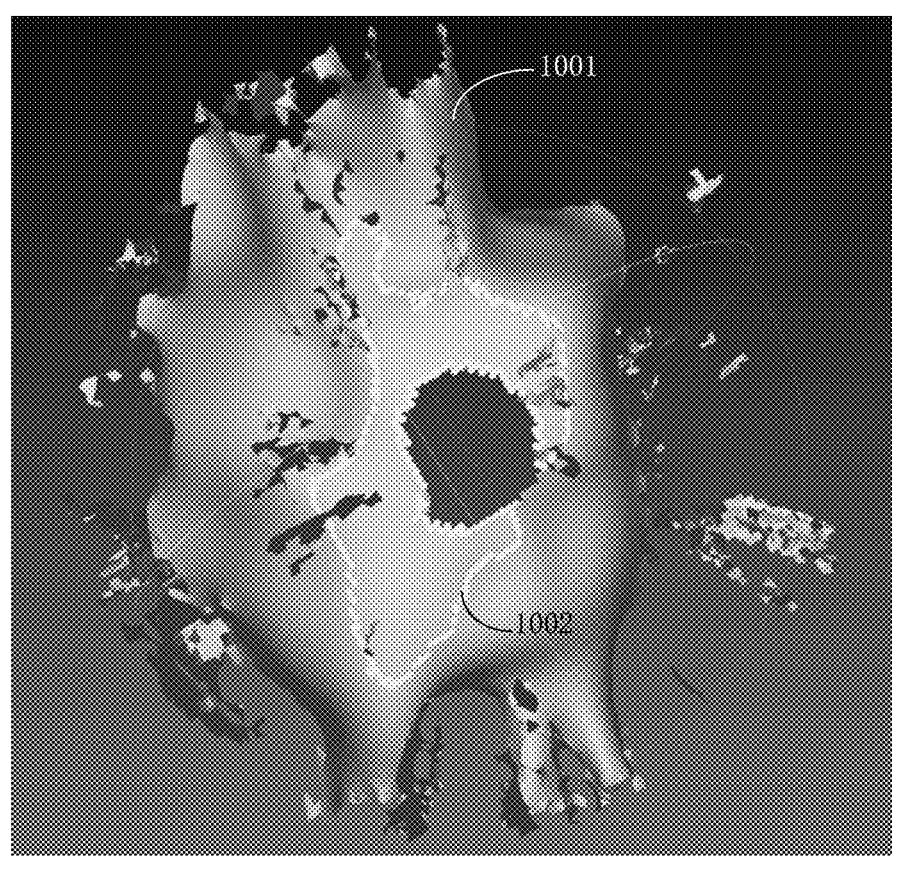
FIG. 10 is a schematic diagram of a three-dimensional environment model and ground boundary points according to an aspect of this disclosure.

For example, as shown in FIG. 10, a three-dimensional environment model 1001 is obtained after three-dimensional reconstruction, and then ground detection is performed on the three-dimensional environment model 1001 to obtain ground boundary points 1002.

Operation 905: Establish an occupancy grid map. For example, an occupancy grid map is including a plurality of grids corresponding to the ground plane is established.

After the ground boundary points are obtained, an occupancy grid map is generated for fitting a safety boundary. The occupancy grid map refers to rasterizing the ground plane, so that the occupancy grid map includes a plurality of grids, and each grid has an occupied state and an idle state.

In one aspect, a map size of the occupancy grid map may be preset by a developer, with a fixed area. Alternatively, in one aspect, a map size of the occupancy grid map may be determined according to an environment size of the surrounding environment.

When the size of the occupancy grid map is determined according to the environment size of the surrounding environment, in a possible implementation, the map size of the occupancy grid map may be determined according to space parameters of the environmental space inputted by a user, and the occupancy grid map is established.

Figure 11:
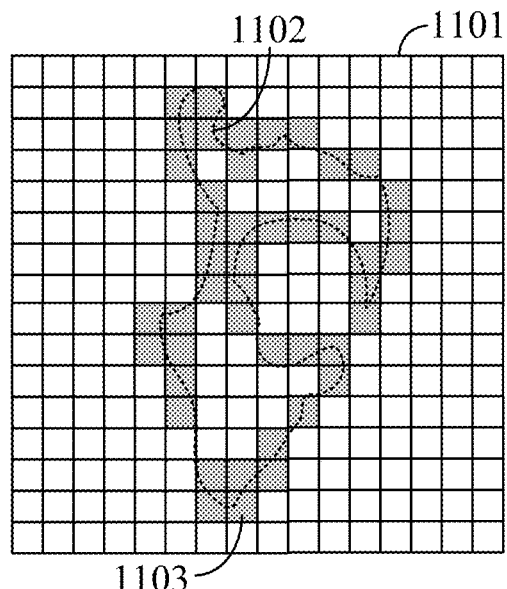
FIG. 11 is a schematic diagram of performing boundary filling on an occupancy grid map according to an aspect of this disclosure.

Alternatively, in another possible implementation, the occupancy grid map is configured for fitting the ground boundary points. Therefore, the map size of the occupancy grid map may be determined according to the ground boundary points. In one aspect, a distance between two farthest ground boundary points may be determined as a side length of the occupancy grid map. The side length of the occupancy grid map is greater than or equal to the distance between the two farthest ground boundary points. The two farthest ground boundary points are two ground boundary points having a longest distance among all the ground boundary points. For example, as shown in FIG. 11, an occupancy grid map 1101 is established, consisting of a plurality of grids (squares) with a same size.

Operation 906: Perform boundary filling on the occupancy grid map based on coordinates of the ground boundary points to obtain occupied occupancy grids. For example, boundary filling in the occupancy grid map is performed based on coordinates of the plurality of ground boundary points to obtain a plurality of occupied grids.

After the occupancy grid map is obtained, the ground boundary points may be filled in the map. In a possible implementation, the computer device determines a corresponding grid according to coordinates of the ground boundary point in the ground plane, and fills the grid to make it become an occupancy grid in an occupied state, or referred to as an occupied grid for short.

That is, when a ground boundary point falls within a grid, the grid changes to an occupied state. In a possible implementation, when any ground boundary point falls within a grid, it may be determined that the grid is occupied. Correspondingly, when no ground boundary point falls within the grid, it is determined that the grid is an empty grid, that is, in an idle state. Alternatively, in another possible implementation, to improve fitting accuracy, when ground boundary points of a quantity greater than a quantity threshold fall within a grid, it is determined that the grid is occupied, and the grid is determined as an occupancy grid. Correspondingly, when no ground boundary point falls within the grid, or a quantity of ground boundary points falling within the grid is less than the quantity threshold, it is determined that the grid is an empty grid, that is, in an idle state. For example, the quantity threshold may be 3. When three or more ground boundary points fall within a grid A, it is determined that the grid is occupied.

For example, as shown in FIG. 11, boundary filling is performed on the occupancy grid map 1101 according to ground boundary points 1102 to obtain occupied occupancy grids 1103 (gray grids in the figure).

Operation 907: Perform curve fitting based on centers of gravity of the occupancy grids to obtain a safety boundary. For example, curve fitting is performed based on centers of gravity of the occupied grids to obtain the safety boundary.

After the occupancy grids (that is, the occupied grids) are obtained, curve fitting may be performed according to the centers of gravity (that is, center positions of the squares) of the occupancy grids to obtain the safety boundary, that is, the ground boundary points falling within the occupancy grids are fused into one point, to improve fitting efficiency.

In a possible implementation, the centers of gravity of the grids may be fitted through polynomial curve fitting, and a curve obtained through fitting is the safety boundary. In another possible implementation, due to a possibly large quantity of occupancy grids, performing fitting according to centers of gravity of all the occupancy grids may have a problem of a relatively large fitting error. Therefore, the centers of gravity of the occupancy grids may be divided, to obtain n groups of centers of gravity, all the groups of centers of gravity are adjacent (that is, corresponding occupancy grids are adjacent), and each group of centers of gravity includes k centers of gravity. Polynomic curve fitting is performed on the k centers of gravity to obtain a local curve corresponding to each group, and then the local curves are connected to obtain the safety boundary.

In one aspect, in a manner of dividing the centers of gravity of the occupancy grids, a quantity of groups to be divided may be preset (n is set). For example, the occupancy grids are divided into 50 groups (n=50), and 50 curves obtained by respectively fitting the 50 groups of grids are connected to obtain the safety boundary. Alternatively, a quantity of centers of gravity included in each group may be preset (k is set). For example, the quantity of centers of gravity included in each group is 10 (k=10). According to positions of the occupancy grids, 10 adjacent occupancy grids are divided into one group to obtain several groups of grids, and curves obtained through fitting of the several groups of grids are connected to obtain the safety boundary. Certainly, another division manner may alternatively be used, to perform polynomial curve fitting on every several points, and curves are connected to obtain the safety boundary. The manner of dividing the centers of gravity is not limited in this aspect, and is merely described as an example.

Operation 908: Determine a prompt region based on surrounding empty grids of the occupancy grids, the surrounding empty grid being an empty grid between which and the occupancy grid a quantity of grids is less than a quantity threshold, and the empty grid being an unoccupied grid. For example, a prompt region is determined based on a plurality of unoccupied grids adjacent to the plurality of occupied grids. A quantity of grids between each unoccupied grid and any occupied grid is less than a quantity threshold.

In other words, a prompt region is determined based on surrounding empty grids of the occupied grids, a quantity of grids between the surrounding empty grid and the occupied grid being less than a quantity threshold, and the surrounding empty grid being unoccupied.

In a possible implementation, after the safety boundary is generated, a safety prompt may be given to the wearer based on the safety boundary. However, in another possible implementation, because the safety boundary is located at a junction between the ground plane and the obstacle, if the wearer is close to the safety boundary, a collision may easily occur. Therefore, the prompt region may be sub-divided according to the occupancy grids to prompt that the wearer is approaching the safety boundary, thereby improving safety of activities of the wearer.

The computer device may determine the prompt region according to the positions of the occupancy grids. In one aspect, an empty grid with a quantity of grids spaced apart from the occupancy grid less than a quantity threshold may be determined, and a grid position of the empty grid is determined as the prompt region.

There are prompt regions inside and outside the safety boundary. To be specific, surrounding empty grids are determined according to the occupancy grids, so that grid positions of the surrounding empty grids are determined as the prompt region.

Operation 909: Give a safety prompt in a case that a wearer enters the prompt region, the safety prompt being configured for prompting that the wearer is approaching the safety boundary. For example, a safety prompt is provided to the user when the user enters the prompt region, the safety prompt indicating the user is approaching the safety boundary.

In a possible implementation, in a case that it is detected that the wearer enters the prompt region, a safety prompt is given to prompt that the wearer is approaching the safety boundary. Prompt content may vary with different positional relationships between the wearer and the safety boundary. In one aspect, in a case that it is detected that the wearer is outside the safety boundary and enters the prompt region, the computer device may prompt that the wearer is to enter the safety boundary. In a case that it is detected that the wearer is inside the safety boundary and enters the prompt region, the computer device may prompt that the wearer is to move away from the safety boundary. In addition, when the wearer enters the prompt region, to enable the wearer to move toward a central region of a safety region, in a possible implementation, the computer device may guide the wearer in a direction, so that the wearer can move toward the central region of the safety region, thereby improving safety of activities.

In an example, an overall process of generating the safety boundary may be as follows: After wearing a head-mounted display device, a wearer observes a surrounding environment. A camera in the head-mounted display device may capture a surrounding environment image, and thus a plurality of frames of depth maps are obtained based on the surrounding environment image. Based on a distance between the camera and a voxel during movement and depth information indicated by a corresponding depth map, a positional relationship between the voxel and a surface of an obstacle may be iteratively updated, and thus three-dimensional reconstruction is performed based on the positional relationship, to obtain a three-dimensional environment model. In addition, the process of three-dimensional reconstruction may be synchronously performed when the wearer observes around.

After the three-dimensional environment model is obtained, a ground plane may be extracted to obtain an accurate ground plane equation, and ground points in the three-dimensional environment model are determined according to the ground plane equation. Then, ground boundary points are determined according to a connection relationship between the ground points, and thus a safety boundary is obtained through fitting based on the ground boundary points. A total time for generating the safety boundary is about 4 s, which can improve efficiency of generating the safety boundary.

In this aspect, an accurate ground plane equation may be obtained through iteration by combining a direction of gravity and three-dimensional points in the three-dimensional environment model, thereby ensuring detection accuracy of ground boundary points, and helping improve accuracy of safety boundary fitting. In addition, in this aspect, the ground boundary points are fitted based on occupancy grid maps, so that ground boundary points at adjacent positions (boundary points falling within a same grid) can be fused into one point for curve fitting. This not only can reduce a fitting error, but also can improve fitting efficiency. In addition, in the process of curve fitting, grouped fitting may be further performed on the ground boundary points to obtain several local curves, and then the local curves are connected to obtain the safety boundary, so that fitting accuracy can be improved. In addition, in this aspect, in addition to generating the safety boundary, a prompt region may be further determined according to occupancy grids, so that a safety prompt is given when the wearer is approaching the safety boundary, thereby improving safety of activities of the wearer.

FIG. 12 is a block diagram of a structure of a safety boundary generation apparatus according to an example aspect of this disclosure. The apparatus includes:

a three-dimensional reconstruction module 1201, configured to perform, in a case that a surrounding environment image captured by a camera in a head-mounted display device is received, three-dimensional reconstruction based on the surrounding environment image to obtain a three-dimensional environment model, the three-dimensional environment model being configured for indicating a surrounding environment status of a wearer corresponding to the head-mounted display device; or a three-dimensional reconstruction module 1201, configured to receive a surrounding environment image captured by a camera in a head-mounted display device, and perform three-dimensional reconstruction based on the surrounding environment image to obtain a three-dimensional environment model, the three-dimensional environment model being configured for indicating a surrounding environment status of a wearer wearing the head-mounted display device;

a boundary point detection module 1202, configured to perform ground detection on the three-dimensional environment model to obtain ground boundary points, the ground boundary point being an intersection point between a ground plane and an obstacle in a surrounding environment; and a boundary fitting module 1203, configured to obtain a safety boundary through fitting based on the ground boundary points, a region inside the safety boundary being a safety region for the wearer to carry out an activity, or a boundary fitting module 1203, configured to determine a safety boundary based on the ground boundary points, a region enclosed by the safety boundary being a safety region for the wearer to carry out an activity.

In one aspect, the three-dimensional reconstruction module 1201 is configured to: initialize a stereoscopic space based on the surrounding environment image, a space size of the stereoscopic space being consistent with a size of an environmental space of the surrounding environment; determine an SDF value of a voxel based on a distance from the voxel in the stereoscopic space to the camera and a depth value of a projection point of the voxel on a camera image, the SDF value being configured for representing a positional relationship between the voxel and a surface of an obstacle, the projection point of the voxel on the camera image being also referred to as a voxel projection point, and the voxel projection point being an intersection point between the surface of the obstacle and a three-dimensional line obtained by connecting the voxel and an optical center of the camera; and perform three-dimensional reconstruction based on SDF values of all voxels to obtain the three-dimensional environment model.

In one aspect, the three-dimensional reconstruction module 1201 is configured to: perform three-dimensional reconstruction calculation based on the SDF values of all the voxels by using an MC algorithm, to obtain an initial three-dimensional environment model; perform repair processing on the initial three-dimensional environment model (for example, perform repair processing on a connection relationship between patches in the initial three-dimensional environment model) to obtain a repaired three-dimensional environment model; and perform simplification processing on the repaired three-dimensional environment model to obtain the three-dimensional environment model, the simplification processing being configured for removing redundant patches.

In one aspect, the three-dimensional reconstruction module 1201 is configured to: perform patch division on the initial three-dimensional environment model; remove a duplicate patch and an independent patch from the patches, the independent patch being a patch having no connection relationship with other patches; remove duplicate points included in the patches and independent points located outside the patches; and reconstruct a connection relationship between remaining patches and remaining connection points to obtain the repaired three-dimensional environment model.

Alternatively, in other words, the three-dimensional reconstruction module 1201 is configured to: perform patch division on the initial three-dimensional environment model to obtain a plurality of patches, one patch being obtained by connecting a plurality of connection points; remove a duplicate patch and an independent patch from the plurality of patches to obtain remaining patches, the independent patch having no connection relationship with other patches, and the other patches being patches in the plurality of patches other than the independent patch; remove a duplicate point and an independent point from the plurality of connection points to obtain remaining connection points, the independent point being located outside the plurality of patches; and reconstruct a connection relationship between the remaining patches and the remaining connection points to obtain the repaired three-dimensional environment model.

In one aspect, the three-dimensional reconstruction module 1201 is configured to: remove a reconstructed patch in the repaired three-dimensional environment model in a case that a total quantity of connections of the reconstructed patch is less than a connection threshold, the reconstructed patch being obtained through the repair processing; remove a reconstructed patch in a case that a distance between the reconstructed patch and the camera is greater than a distance threshold; remove reconstructed patches belonging to an independent region in a case that a region volume of the independent region formed by the reconstructed patches is less than a volume threshold; and determine the repaired three-dimensional environment model after patch removal as the three-dimensional environment model.

In one aspect, the three-dimensional reconstruction module 1201 is configured to: determine an $i^{th}$ frame of initial SDF value of the voxel based on a difference between an $i^{th}$ distance from the voxel to the camera and an $i^{th}$ depth value of a projection point of the voxel on a camera image (that is, the voxel projection point) indicated by an $i^{th}$ frame of depth map, i being a positive integer; and update the $i^{th}$ frame of initial SDF value based on an $i^{th}$ frame of update weight corresponding to the voxel and an $(i-1)^{th}$ frame of SDF value to obtain an $i^{th}$ frame of SDF value, the $i^{th}$ frame of update weight being determined based on an angle between the three-dimensional line between the optical center of the camera and the voxel and an $i^{th}$ line-of-sight direction of the camera.

In one aspect, the three-dimensional reconstruction module 1201 is configured to: generate a depth map corresponding to the surrounding environment based on the surrounding environment image; and initialize the stereoscopic space based on a maximum depth value in the depth map.

In one aspect, the boundary point detection module 1202 is configured to: perform iteration based on a direction of gravity and three-dimensional points in the three-dimensional environment model to obtain a ground plane; perform ground detection on the three-dimensional environment model based on the ground plane to determine ground points in the three-dimensional environment model; and establish a connection relationship between the ground points to obtain the ground boundary points of the ground plane.

In one aspect, the boundary point detection module 1202 is configured to: establish an $i^{th}$ plane based on the direction of gravity and an $i^{th}$ three-dimensional point in the three-dimensional environment model, the direction of gravity being a normal direction of the $i^{th}$ plane, and i being a positive integer; verify the $i^{th}$ plane based on remaining three-dimensional points in the three-dimensional environment model to obtain a quantity of three-dimensional points conforming to the $i^{th}$ plane, the remaining three-dimensional points being points (or three-dimensional points) in the three-dimensional environment model other than the $i^{th}$ three-dimensional point; and determine a plane corresponding to a largest quantity of three-dimensional points as the ground plane, the largest quantity of three-dimensional points being a largest quantity of three-dimensional points among all quantities of three-dimensional points.

In one aspect, the boundary fitting module 1203 is configured to: establish an occupancy grid map, the occupancy grid map including grids; perform boundary filling on the occupancy grid map based on coordinates of the ground boundary points to obtain occupied occupancy grids, that is, obtain occupied grids; and perform curve fitting based on centers of gravity of the occupancy grids (occupied grids) to obtain the safety boundary.

In one aspect, the apparatus further includes: a region determining module, configured to determine a prompt region based on surrounding empty grids of the occupancy grids, the surrounding empty grid being an empty grid between which and the occupancy grid a quantity of grids is less than a quantity threshold, and the empty grid being an unoccupied grid; or a region determining module, configured to determine a prompt region based on surrounding empty grids of the occupied grids, a quantity of grids between the surrounding empty grid and the occupied grid being less than a quantity threshold, and the surrounding empty grid being unoccupied; and a safety prompt module, configured to give a safety prompt in a case that the wearer enters the prompt region, the safety prompt being configured for prompting that the wearer is approaching the safety boundary.

In one aspect, the camera is a multi-lens camera or a depth camera.

In this aspect of this disclosure, when a wearer wears a head-mounted display device, three-dimensional reconstruction may be performed based on an surrounding environment image captured by a camera in the head-mounted display device to obtain a three-dimensional environment model, so that intersection points between a ground and an obstacle, that is, ground boundary points, may be extracted based on the three-dimensional environment model to generate a safety boundary, and a safety region in which the wearer can carry out an activity may be automatically generated without manual demarcation by the wearer, thereby improving efficiency of generating the safety boundary. In addition, due to the reconstruction for the three-dimensional environment model, the extraction of the ground boundary points according to the three-dimensional environment model can improve accuracy of extracting the ground boundary points, that is, improve accuracy of generating the safety boundary.

The apparatus provided in the foregoing aspect is illustrated only with an example of division of the foregoing function modules. In practical applications, the foregoing functions may be allocated to and completed by different function modules according to requirements. That is, the internal structure of the apparatus is divided into different function modules to complete all or some of the functions described above. In addition, the apparatus provided in the foregoing aspect is based on the same concept as the method aspect. For details of an implementation process of the apparatus, refer to the method aspect. The details are not described herein again.

FIG. 13 is a block diagram of a structure of a computer device according to an example of an aspect of this disclosure. Specifically, a computer device 1300 includes a central processing unit (CPU) 1301 (e.g., processing circuitry), a system memory 1304 (e.g., a non-transitory computer-readable storage medium) including a random access memory (RAM) 1302 and a read-only memory (ROM) 1303, and a system bus 1305 connecting the system memory 1304 and the CPU 1301. The computer device 1300 further includes a basic input/output (I/O) system 1306 assisting in information transmission between components in the computer, and a mass storage device 1307 configured to store an operating system 1313, an application program 1314, and another program module 1315.

In some aspects, the basic I/O system 1306 includes a display 1308 configured to display information and an input device 1309, such as a mouse or a keyboard, configured to input information by a user. The display 1308 and the input device 1309 are both connected to the CPU 1301 by using an I/O controller 1310 connected to the system bus 1305. The basic I/O system 1306 may further include the I/O controller 1310 to be configured to receive and process inputs from a plurality of other devices such as a keyboard, a mouse, and an electronic stylus. Similarly, the I/O controller 1310 further provides an output to a display screen, a printer, or another type of output device.

The mass storage device 1307 is connected to the CPU 1301 by using a mass storage controller (not shown) connected to the system bus 1305. The mass storage device 1307 and a non-transitory computer-readable medium associated therewith provide non-volatile storage to the computer device 1300. In other words, the mass storage device 1307 may include a non-transitory computer-readable medium (not shown) such as a hard disk or a drive.

Without loss of generality, the non-transitory computer-readable medium may include a computer storage medium and a communication medium. The non-transitory computer storage medium includes volatile and non-volatile media, and removable and non-removable media implemented by using any method or technology used for storing information such as computer-readable instructions, data structures, program modules, or other data. The non-transitory computer storage medium includes a RAM, a ROM, a flash memory or another solid-state storage technology, a compact disc ROM (CD-ROM), a digital versatile disc (DVD) or another optical memory, a magnetic cassette, a magnetic tape, a magnetic disk memory, or another magnetic storage device. Certainly, a person skilled in art can learn that the non-transitory computer storage medium is not limited to the foregoing several types. The system memory 1304 and the mass storage device 1307 may be collectively referred to as a memory.

The memory stores one or more programs. The one or more programs are configured for being executed by one or more CPUs 1301. The one or more programs include instructions configured for implementing the foregoing methods. The CPU 1301 executes the one or more programs to implement the methods provided in the foregoing method aspects.

According to the aspects of this disclosure, the computer device 1300 may further be connected, through a network such as the Internet, to a remote computer on the network and run. That is, the computer device 1300 may be connected to a network 1312 by using a network interface unit 1311 connected to the system bus 1305, or may be connected to another type of network or a remote computer system (not shown) by using a network interface unit 1311.

The memory further includes one or more programs. The one or more programs are stored in the memory and include operations to be performed by the computer device in the methods provided in the aspects of this disclosure.

An aspect of this disclosure further provides a computer-readable storage medium. The computer-readable storage medium stores at least one instruction, at least one program, and a code set or an instruction set. The at least one instruction, the at least one program, and the code set or the instruction set are loaded and executed by a processor to implement the safety boundary generation method according to any one of the foregoing aspects.

An aspect of this disclosure provides a computer program product or a computer program, including computer instructions, the computer instructions being stored in a non-transitory computer-readable storage medium, a processor of a computer device reading the computer instructions from the non-transitory computer-readable storage medium, and the processor executing the computer instructions to cause the computer device to perform the safety boundary generation method according to the foregoing aspects.

A person of ordinary skill in the art may understand that all or some of the operations of the methods in the foregoing aspects may be completed by a program instructing relevant hardware. The program may be stored in a non-transitory computer-readable storage medium. The non-transitory computer-readable storage medium may be the non-transitory computer-readable storage medium included in the memory in the foregoing aspect, or may be a non-transitory computer-readable storage medium that exists independently and that is not assembled in a terminal. The non-transitory computer-readable storage medium stores at least one instruction, at least one segment of program, and a code set or an instruction set. The at least one instruction, the at least one segment of program, and the code set or the instruction set are loaded and executed by the processor to implement the safety boundary generation method according to any one of the foregoing method aspects.

In one aspect, the non-transitory computer-readable storage medium may include: a ROM, a RAM, a solid state drive (SSD), an optical disc, or the like. The RAM may include a resistance RAM (ReRAM) and a dynamic RAM (DRAM). The sequence numbers of the foregoing aspects of this disclosure are merely for description purpose but do not imply the preference among the aspects.

A person of ordinary skill in the art may understand that all or some of operations of the foregoing aspects may be implemented by hardware, or may be implemented by a program instructing relevant hardware. The program may be stored in a non-transitory computer-readable storage medium. The non-transitory computer-readable storage medium may be a ROM, a magnetic disk, an optical disc, or the like.

The foregoing descriptions are example aspects of this disclosure, and are not intended to limit this disclosure. Any modification, equivalent replacement, or improvement made within the principle of this disclosure shall fall within the protection scope of this disclosure.

What is claimed is:

1. A safety boundary generation method, comprising:
   receiving an image of a surrounding environment captured by a camera in a head-mounted display device;
   performing three-dimensional reconstruction based on the image of the surrounding environment to obtain a three-dimensional environment model, the three-dimensional environment model indicating a three-dimensional representation of the surrounding environment of a user that wears the head-mounted display device;
   performing, by processing circuitry, ground detection on the three-dimensional environment model to determine a ground plane from the three-dimensional environment model;
   determining a plurality of ground boundary points, each of the plurality of ground boundary points being an intersection point between the ground plane and an obstacle in the surrounding environment; and
   determining a safety boundary based on the plurality of ground boundary points, a region enclosed by the safety boundary being a safety region for the user to interact with the head-mounted display device.

2. The method according to claim 1, wherein the performing the three-dimensional reconstruction comprises:
   initializing a stereoscopic space based on the image of the surrounding environment;
   determining a signed distance field (SDF) value for each voxel of a plurality of voxels in the stereoscopic space based on a distance from the respective voxel to the camera and a depth value of a voxel projection point on a surface of the obstacle, the voxel projection point being an intersection point between a three-dimensional line from the voxel to an optical center of the camera and the surface of the obstacle, the SDF value representing a positional relationship between the respective voxel and the surface of the obstacle; and
   performing the three-dimensional reconstruction based on the SDF values of the plurality of voxels to obtain the three-dimensional environment model.

3. The method according to claim 2, wherein the performing the three-dimensional reconstruction comprises:

performing a three-dimensional reconstruction calculation based on a marching cubes (MC) algorithm, to obtain an initial three-dimensional environment model;

performing repair processing on the initial three-dimensional environment model to obtain a repaired three-dimensional environment model; and performing simplification processing on the repaired three-dimensional environment model in which a plurality of redundant patches is removed to obtain the three-dimensional environment model.

4. The method according to claim 3, wherein the performing the repair processing on the initial three-dimensional environment model comprises:

dividing the initial three-dimensional environment model into a plurality of patches, each of the plurality of patches being obtained by connecting a plurality of connection points;

removing duplicate patches and independent patches from the plurality of patches to obtain remaining patches, each independent patch having no connection relationship with any of the other patches;

removing duplicate points and independent points from the plurality of connection points to obtain remaining connection points, each independent point being located outside the plurality of patches; and reconstructing connection relationships between the remaining patches and the remaining connection points to obtain the repaired three-dimensional environment model.

5. The method according to claim 4, wherein the performing the simplification processing on the repaired three-dimensional environment model comprises:

removing a first reconstructed patch in the repaired three-dimensional environment model when a total quantity of connections of the first reconstructed patch is less than a connection threshold, the first reconstructed patch being obtained via the repair processing;

removing a second reconstructed patch when a distance between the second reconstructed patch and the camera is greater than a distance threshold;

removing a plurality of reconstructed patches belonging to an independent region when a region volume of the independent region is less than a volume threshold; and determining the repaired three-dimensional environment model in which the plurality of reconstructed patches is removed as the three-dimensional environment model.

6. The method according to claim 2, wherein the determining the SDF value for each voxel of the plurality of voxels comprises:

determining an $i^{th}$ frame initial SDF value for each voxel based on a difference between an $i^{th}$ distance from the respective voxel to the camera and an $i^{th}$ depth value of the voxel projection point indicated by an $i^{th}$ frame of a depth map, i being a positive integer; and updating the $i^{th}$ frame initial SDF value based on an $i^{th}$ frame of update weight corresponding to the respective voxel and an $(i-1)^{th}$ frame of SDF value to obtain an $i^{th}$ frame of SDF value, the $i^{th}$ frame of update weight being determined based on an angle between the three-dimensional line from the respective voxel to the optical center of the camera and an $i^{th}$ line-of-sight direction of the camera.

7. The method according to claim 2, wherein the initializing the stereoscopic space comprises:

generating a depth map corresponding to the surrounding environment based on the image of the surrounding environment; and initializing the stereoscopic space based on a maximum depth value in the depth map.

8. The method according to claim 1, wherein the performing the ground detection on the three-dimensional environment model comprises:

iteratively determining a ground plane based on a direction of gravity and a plurality of three-dimensional points in the three-dimensional environment model;

identifying a plurality of ground points in the three-dimensional environment model based on the ground plane; and establishing a connection relationship between the plurality of ground points to obtain the plurality of ground boundary points on the ground plane.

9. The method according to claim 8, wherein the iteratively determining the ground plane comprises:

establishing an $i^{th}$ plane based on the direction of gravity as a normal vector and an $i^{th}$ three-dimensional point in the three-dimensional environment model, i being a positive integer;

verifying the $i^{th}$ plane based on a plurality of remaining three-dimensional points in the three-dimensional environment model to obtain a quantity of three-dimensional points conforming to the $i^{th}$ plane, the remaining three-dimensional points being three-dimensional points in the three-dimensional environment model other than the $i^{th}$ three-dimensional point; and determining a plane corresponding to the largest quantity of conforming three-dimensional points as the ground plane.

10. The method according to claim 1, wherein the determining the safety boundary based on the plurality of ground boundary points comprises:

establishing an occupancy grid map including a plurality of grids corresponding to the ground plane;

performing boundary filling in the occupancy grid map based on coordinates of the plurality of ground boundary points to obtain a plurality of occupied grids; and performing curve fitting based on centers of gravity of the occupied grids to obtain the safety boundary.

11. The method according to claim 10, further comprising:

determining a prompt region based on a plurality of unoccupied grids adjacent to the plurality of occupied grids, a quantity of grids between each unoccupied grid and any occupied grid being less than a quantity threshold; and providing a safety prompt to the user when the user enters the prompt region, the safety prompt indicating the user is approaching the safety boundary.

12. The method according to claim 1, wherein the camera is a multi-lens camera or a depth camera.

13. An apparatus, comprising:

processing circuitry configured to:

receive an image of a surrounding environment captured by a camera in a head-mounted display device;

perform three-dimensional reconstruction based on the image of the surrounding environment to obtain a three-dimensional environment model, the three-dimensional environment model indicating a three-dimensional representation of the surrounding environment of a user that wears the head-mounted display device;

perform ground detection on the three-dimensional environment model to determine a ground plane from the three-dimensional environment model;

determine a plurality of ground boundary points, each of the plurality of ground boundary points being an intersection point between the ground plane and an obstacle in the surrounding environment; and determine a safety boundary based on the plurality of ground boundary points, a region enclosed by the safety boundary being a safety region for the user to interact with the head-mounted display device.

14. The apparatus according to claim 13, wherein the processing circuitry is configured to:

initialize a stereoscopic space based on the image of the surrounding environment;

determine a signed distance field (SDF) value for each voxel of a plurality of voxels in the stereoscopic space based on a distance from the respective voxel to the camera and a depth value of a voxel projection point on a surface of the obstacle, the voxel projection point being an intersection point between a three-dimensional line from the voxel to an optical center of the camera and the surface of the obstacle, the SDF value representing a positional relationship between the respective voxel and the surface of the obstacle; and perform the three-dimensional reconstruction based on the SDF values of the plurality of voxels to obtain the three-dimensional environment model.

15. The apparatus according to claim 14, wherein the processing circuitry is configured to:

perform a three-dimensional reconstruction calculation based on a marching cubes (MC) algorithm, to obtain an initial three-dimensional environment model;

perform repair processing on the initial three-dimensional environment model to obtain a repaired three-dimensional environment model; and perform simplification processing on the repaired three-dimensional environment model in which a plurality of redundant patches is removed to obtain the three-dimensional environment model.

16. The apparatus according to claim 15, wherein the processing circuitry is configured to:

divide the initial three-dimensional environment model into a plurality of patches, each of the plurality of patches being obtained by connecting a plurality of connection points;

remove duplicate patches and independent patches from the plurality of patches to obtain remaining patches, each independent patch having no connection relationship with any of the other patches;

remove duplicate points and independent points from the plurality of connection points to obtain remaining connection points, each independent point being located outside the plurality of patches; and reconstruct connection relationships between the remaining patches and the remaining connection points to obtain the repaired three-dimensional environment model.

17. The apparatus according to claim 16, wherein the processing circuitry is configured to:

remove a first reconstructed patch in the repaired three-dimensional environment model when a total quantity of connections of the first reconstructed patch is less than a connection threshold, the first reconstructed patch being obtained via the repair processing;

remove a second reconstructed patch when a distance between the second reconstructed patch and the camera is greater than a distance threshold;

remove a plurality of reconstructed patches belonging to an independent region when a region volume of the independent region is less than a volume threshold; and determine the repaired three-dimensional environment model in which the plurality of reconstructed patches is removed as the three-dimensional environment model.

18. The apparatus according to claim 14, wherein the processing circuitry is configured to:

determine an $i^{th}$ frame initial SDF value for each voxel based on a difference between an $i^{th}$ distance from the respective voxel to the camera and an $i^{th}$ depth value of the voxel projection point indicated by an $i^{th}$ frame of a depth map, i being a positive integer; and update the $i^{th}$ frame initial SDF value based on an $i^{th}$ frame of update weight corresponding to the respective voxel and an $(i-1)^{th}$ frame of SDF value to obtain an $i^{th}$ frame of SDF value, the $i^{th}$ frame of update weight being determined based on an angle between the three-dimensional line from the respective voxel to the optical center of the camera and an $i^{th}$ line-of-sight direction of the camera.

19. The apparatus according to claim 14, wherein the processing circuitry is configured to:

generate a depth map corresponding to the surrounding environment based on the image of the surrounding environment; and initialize the stereoscopic space based on a maximum depth value in the depth map.

20. A non-transitory computer-readable storage medium storing instructions which, when executed by a processor, cause the processor to perform:

receiving an image of a surrounding environment captured by a camera in a head-mounted display device;

performing three-dimensional reconstruction based on the image of the surrounding environment to obtain a three-dimensional environment model, the three-dimensional environment model indicating a three-dimensional representation of the surrounding environment of a user that wears the head-mounted display device;

performing ground detection on the three-dimensional environment model to determine a ground plane from the three-dimensional environment model;

determining a plurality of ground boundary points, each of the plurality of ground boundary points being an intersection point between the ground plane and an obstacle in the surrounding environment; and determining a safety boundary based on the plurality of ground boundary points, a region enclosed by the safety boundary being a safety region for the user to interact with the head-mounted display device.

* * * * *